(12) United States Patent
Wang et al.

(10) Patent No.: US 12,510,619 B2
(45) Date of Patent: Dec. 30, 2025

(54) ANTENNA POSITIONING METHOD FOR FIRST BASE STATION AND COMMUNICATION APPARATUS

(71) Applicant: HUAWEI TECHNOLOGIES CO., LTD., Guangdong (CN)

(72) Inventors: Hui Wang, Shanghai (CN); Tianxiang Zhou, Shanghai (CN); Chaoyun Hu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 359 days.

(21) Appl. No.: 18/158,319

(22) Filed: Jan. 23, 2023

(65) Prior Publication Data

US 2023/0160992 A1 May 25, 2023

Related U.S. Application Data

(63) Continuation of application No. PCT/CN2020/104590, filed on Jul. 24, 2020.

(51) Int. Cl.
*G01S 3/16* (2006.01)
*H04B 17/318* (2015.01)
*H04W 16/28* (2009.01)

(52) U.S. Cl.
CPC .............. *G01S 3/16* (2013.01); *H04B 17/318* (2015.01); *H04W 16/28* (2013.01)

(58) Field of Classification Search
CPC ......... G01S 3/16; H04B 17/318; H04W 16/28
USPC ....................................................... 342/417
See application file for complete search history.

(56) References Cited

U.S. PATENT DOCUMENTS

| 2013/0303145 | A1  | 11/2013 | Harrang et al. |
| 2018/0049177 | A1* | 2/2018  | Islam ................. H04B 7/06966 |
| 2020/0236573 | A1  | 7/2020  | Zhang et al. |
| 2021/0396831 | A1  | 12/2021 | Fleischer et al. |

FOREIGN PATENT DOCUMENTS

| CN | 102572928 A | 7/2012 |
| CN | 103686781 A | 3/2014 |
| CN | 106211186 A | 12/2016 |

(Continued)

OTHER PUBLICATIONS

Extended European Search Report in European Appln No. 20946373.6, dated Jul. 25, 2023, 9 pages.

(Continued)

*Primary Examiner* — Harry K Liu
(74) *Attorney, Agent, or Firm* — Fish & Richardson P.C.

(57) ABSTRACT

Example antenna positioning methods for a first base station and communication apparatus are described. One example method includes receiving a first reference signal received power (RSRP) value by a server from a first base station, where the first RSRP value is measured by the first base station and is of a reference signal from a first neighboring base station of the first base station. The server determines an antenna azimuth of the first base station based on an RSRP set corresponding to the first neighboring base station and the first RSRP value, where the RSRP set corresponding to the first neighboring base station includes N RSRP values, and the N RSRP values correspond to N antenna azimuths of the first base station.

20 Claims, 13 Drawing Sheets

(56) References Cited

FOREIGN PATENT DOCUMENTS

| CN | 107121125 A | | 9/2017 | |
|---|---|---|---|---|
| CN | 108882292 A | | 11/2018 | |
| CN | 109565808 A | * | 4/2019 | .......... H04W 72/542 |
| CN | 111050331 A | | 4/2020 | |
| EP | 3314801 B1 | | 5/2020 | |
| JP | 6532817 B2 | | 6/2019 | |
| WO | 2013075520 A1 | | 5/2013 | |
| WO | WO-2018031848 A1 | * | 2/2018 | .......... H04W 72/542 |
| WO | 2020089318 A1 | | 5/2020 | |
| WO | WO-2020166981 A1 | * | 8/2020 | ............ H04W 16/28 |

OTHER PUBLICATIONS

International Search Report and Written Opinion in International Appln. No. PCT/CN2020/104590, mailed on Apr. 16, 2021, 18 pages (with English translation).

* cited by examiner

ANTENNA POSITIONING METHOD FOR FIRST BASE STATION AND COMMUNICATION APPARATUS

CROSS-REFERENCE TO RELATED APPLICATION

This application is a continuation of International Application No. PCT/CN2020/104590, filed on Jul. 24, 2020, the disclosure of which is hereby incorporated by reference in its entirety.

TECHNICAL FIELD

This application relates to the field of communication technologies, and in particular, to an antenna positioning method for a first base station and a communication apparatus.

BACKGROUND

An antenna azimuth of a base station directly affects signal strength and coverage of the base station and interference between base stations. When an antenna is installed for the base station, an optimal antenna azimuth is usually planned for the base station, so that the base station obtains an optimal network coverage capability. However, due to an installation error during antenna installation or impact of an environment factor (for example, bad weather such as a typhoon) after the installation, the antenna azimuth of the base station may deviate from the optimal antenna azimuth. Therefore, the antenna azimuth of the base station needs to be detected to determine whether the antenna of the base station deviates from the optimal antenna azimuth.

To detect the antenna azimuth of the base station, currently, personnel need to use a professional antenna azimuth detection tool near the base station to detect the antenna azimuth. However, because there are a large quantity of base stations that are widely distributed, the method for manually detecting the antenna azimuth is inefficient and costly.

SUMMARY

This application provides an antenna positioning method for a first base station and a communication apparatus, to resolve a problem of low efficiency and high costs of detecting an antenna azimuth in a conventional technology.

To resolve the foregoing technical problem, the following technical solutions are used in this application.

According to a first aspect, an antenna positioning method for a first base station is provided. The method includes: A server receives a first reference signal received power (RSRP) value from the first base station, where the first RSRP value is an RSRP value that is measured by the first base station and that is of a reference signal from a first neighboring base station of the first base station. The server determines an antenna azimuth of the first base station based on an RSRP set corresponding to the first neighboring base station and the first RSRP value, where the RSRP set corresponding to the first neighboring base station includes N RSRP values, the N RSRP values correspond to N antenna azimuths of the first base station, and N is a positive integer.

Based on the foregoing technical solution, the RSRP set corresponding to the first neighboring base station of the first base station includes the N RSRP values and the antenna azimuths corresponding to the N RSRP values. Therefore, when the N RSRP values are RSRP values that are measured by the first base station and that are of reference signals from the first neighboring base station, and the antenna azimuths corresponding to the RSRP values are antenna azimuths of the first base station, the RSRP set corresponding to the first neighboring base station can represent a correspondence between the antenna azimuth of the first base station and the RSRP value that is measured by the first base station. Based on this, the server may determine the antenna azimuth of the first base station based on the RSRP value that is actually measured by the first base station and that is of the reference signal from the first neighboring base station and the RSRP value. In this method, personnel do not need to check an antenna azimuth of a base station on site, so that detection efficiency of detecting the antenna azimuth is improved and detection costs are reduced.

With reference to the first aspect, in a possible implementation, the server determines a second RSRP value, where the second RSRP value is an RSRP value that is in the RSRP set corresponding to the first neighboring base station and that has a highest matching degree with the first RSRP value. The server determines an antenna azimuth corresponding to the second RSRP value as the antenna azimuth of the first base station. Based on this, the antenna azimuth of the first base station determined by the server is an azimuth that is in the RSRP set corresponding to the first neighboring base station and that has a highest matching degree with the actual antenna azimuth of the base station, so that accuracy of the antenna azimuth of the first base station determined by the server is improved.

With reference to the first aspect, in a possible implementation, the second RSRP value is specifically: an RSRP value that is in the RSRP set corresponding to the first neighboring base station and that has a smallest difference from the first RSRP value. Based on this, the antenna azimuth of the first base station determined by the server is an azimuth that is in the RSRP set corresponding to the first neighboring base station and that has a smallest difference from the actual antenna azimuth of the base station, so that the accuracy of the antenna azimuth of the first base station determined by the server is further improved.

With reference to the first aspect, in a possible implementation, the server receives a third RSRP value from the first base station, where the third RSRP value is an RSRP value that is measured by the first base station and that is of a reference signal from a second neighboring base station of the first base station. The server determines the antenna azimuth of the first base station based on the RSRP set corresponding to the first neighboring base station, an RSRP set corresponding to the second neighboring base station, the first RSRP value, and the third RSRP value. The RSRP set corresponding to the second neighboring base station includes K RSRP values, the K RSRP values correspond to K antenna azimuths of the first base station, and K is a positive integer.

Based on this, the server may determine the antenna azimuth of the first base station based on RSRP values that are measured by the first base station and that are of reference signals from a plurality of neighboring base stations as well as RSRP sets corresponding to the plurality of neighboring base stations, so that the antenna azimuth of the first base station determined by the server is more accurate.

With reference to the first aspect, in a possible implementation, the server determines a second RSRP value and a fourth RSRP value. The second RSRP value is an RSRP value that is in the RSRP set corresponding to the first neighboring base station and that has a highest matching degree with the first RSRP value. The fourth RSRP value is an RSRP value that is in the RSRP set corresponding to the second neighboring base station and that has a highest matching degree with the third RSRP value. The server fits an antenna azimuth corresponding to the second RSRP value and an antenna azimuth corresponding to the fourth RSRP value, and determines the antenna azimuth of the first base station.

Based on this, the server may determine a plurality of antenna azimuths of the first base station based on the RSRP values that are measured by the first base station and that are of the reference signals from the plurality of neighboring base stations as well as the RSRP sets corresponding to the plurality of neighboring base stations. The server determines the actual antenna azimuth of the first base station based on the plurality of antenna azimuths in a fitting manner. As a result, the accuracy of the antenna azimuth of the first base station determined by the server can be further improved.

With reference to the first aspect, in a possible implementation, the second RSRP value is specifically: an RSRP value that is in the RSRP set corresponding to the first neighboring base station and that has a smallest difference from the first RSRP value; and the fourth RSRP value is specifically: an RSRP value that is in the RSRP set corresponding to the second neighboring base station and that has a smallest difference from the third RSRP value.

Based on this, the plurality of antenna azimuths of the first base station determined by the server are azimuths that are in the RSRP sets corresponding to the neighboring base stations and that have a smallest difference from the actual antenna azimuth of the base station, so that the accuracy of the antenna azimuth of the first base station determined by the server is further improved.

With reference to the first aspect, in a possible implementation, the server determines, according to a method of least squares, a first antenna azimuth that has a smallest sum of squared errors with the antenna azimuth corresponding to the second RSRP value and the antenna azimuth corresponding to the fourth RSRP value. The server determines the first antenna azimuth as the antenna azimuth of the first base station.

Based on this, the server determines, by using the method of least squares, an antenna azimuth that has a smallest sum of squared errors with the antenna azimuths determined by the plurality of neighboring base stations, and uses the antenna azimuth as the antenna azimuth of the first base station, so that the antenna azimuth of the first base station determined by the server is more accurate.

With reference to the first aspect, in a possible implementation, the N RSRP values in the RSRP set corresponding to the first neighboring base station are: RSRP values that are of reference signals received by the first base station from the first neighboring base station and that are determined by the server through simulation when antenna azimuths of the first base station are the N antenna azimuths.

Based on this, the server determines the RSRP set corresponding to the first neighboring base station by using the simulation, so that personnel are prevented from measuring, on site RSRPs that are measured by the first base station at different antenna azimuths and that are of the neighboring base station. As a result, a workload of the personnel is further reduced.

With reference to the first aspect, in a possible implementation, the K RSRP values in the RSRP set corresponding to the second neighboring base station are: RSRP values that are of reference signals received by the first base station from the second neighboring base station and that are determined by the server through the simulation when antenna azimuths of the first base station are the K antenna azimuths.

Based on this, the server determines the RSRP set corresponding to the second neighboring base station by using the simulation, so that personnel are prevented from measuring, on site, RSRPs that are measured by the first base station at different antenna azimuths and that are of the neighboring base station. As a result, a workload of the personnel is further reduced.

With reference to the first aspect, in a possible implementation, the server sends first indication information to the first base station, where the first indication information indicates the first base station to send the first RSRP value to the server.

Based on this, the first base station may send the first RSRP to the server only when the server indicates the first base station to send the first RSRP value, to reduce signaling overheads between the server and the first base station and reduce workload of the server and the first base station.

With reference to the first aspect, in a possible implementation, the first indication information further indicates configuration information of the reference signal from the first neighboring base station.

Based on this, the first base station may measure the RSRP value of the reference signal from the first neighboring base station based on the configuration information of the reference signal from the first neighboring base station in the first indication information.

According to a second aspect, an antenna positioning method for a first base station is provided. The method includes: A first base station obtains a first RSRP value of a first neighboring base station of the first base station. The first base station sends the first RSRP value to a server.

Based on the foregoing technical solution, the first base station can measure the first RSRP value of a reference signal from the neighboring base station of the first base station, and send the first RSRP value to the server, so that the server may determine an antenna azimuth of the first base station based on the first RSRP value.

With reference to the second aspect, in a possible implementation, the first base station obtains a third RSRP value of a reference signal from a second neighboring base station of the first base station. The first base station sends the third RSRP value to the server.

With reference to the second aspect, in a possible implementation, the first base station receives first indication information from the server, where the first indication information indicates the first base station to send the first RSRP value to the server.

With reference to the second aspect, in a possible implementation, the first indication information further indicates configuration information of a reference signal from the first neighboring base station.

According to a third aspect, an antenna positioning method for a first base station is provided. The method includes: A server receives a first RSRP value from a first neighboring base station of the first base station, where the first RSRP value is an RSRP value that is measured by the first neighboring base station of the first base station and that is of a reference signal from the first base station. The server determines an antenna azimuth of the first base station based on an RSRP set corresponding to the first neighboring base station and the first RSRP value, where the RSRP set corresponding to the first neighboring base station includes N RSRP values, the N RSRP values correspond to N antenna azimuths of the first base station, and N is a positive integer.

Based on the foregoing technical solution, the RSRP set corresponding to the first neighboring base station of the first base station includes the N RSRP values and the antenna azimuths corresponding to the N RSRP values. Therefore, when the N RSRP values are RSRP values that are measured by the first neighboring base station and that are of reference signals from the first base station, and the antenna azimuths corresponding to the RSRP values are antenna azimuths of the first base station, the RSRP set corresponding to the first neighboring base station can represent a correspondence between the antenna azimuth of the first base station and the RSRP value that is measured by the first neighboring base station and that is of the first base station. Based on this, the server may determine the actual antenna azimuth of the first base station based on the RSRP value that is actually measured by the first neighboring base station and that is of the reference signal from the first base station and the RSRP value. In this method, personnel do not need to check an antenna azimuth of a base station on site, so that detection efficiency of detecting the antenna azimuth is improved and detection costs are reduced.

With reference to the third aspect, in a possible implementation, the server determines a second RSRP value, where the second RSRP value is an RSRP value that is in the RSRP set corresponding to the first neighboring base station and that has a highest matching degree with the first RSRP value. The server determines an antenna azimuth corresponding to the second RSRP value as the antenna azimuth of the first base station.

With reference to the third aspect, in a possible implementation, the second RSRP value is specifically: an RSRP value that is in the RSRP set corresponding to the first neighboring base station and that has a smallest difference from the first RSRP value.

With reference to the third aspect, in a possible implementation, the server receives a third RSRP value from a second neighboring base station of the first base station, where the third RSRP value is an RSRP value that is measured by the second neighboring base station of the first base station and that is of a reference signal from the first base station. The server determines the antenna azimuth of the first base station based on the RSRP set corresponding to the first neighboring base station, an RSRP set corresponding to the second neighboring base station, the first RSRP value, and the third RSRP value. The RSRP set corresponding to the second neighboring base station includes K RSRP values, the K RSRP values correspond to K antenna azimuths of the first base station, and K is a positive integer.

With reference to the third aspect, in a possible implementation, the server determines a second RSRP value and a fourth RSRP value. The second RSRP value is an RSRP value that is in the RSRP set corresponding to the first neighboring base station and that has a highest matching degree with the first RSRP value. The fourth RSRP value is an RSRP value that is in the RSRP set corresponding to the second neighboring base station and that has a highest matching degree with the third RSRP value. The server fits an antenna azimuth corresponding to the second RSRP value and an antenna azimuth corresponding to the fourth RSRP value, and determines the antenna azimuth of the first base station.

With reference to the third aspect, in a possible implementation, the second RSRP value is specifically: an RSRP value that is in the RSRP set corresponding to the first neighboring base station and that has a smallest difference from the first RSRP value. The fourth RSRP value is specifically: an RSRP value that is in the RSRP set corresponding to the second neighboring base station and that has a smallest difference from the third RSRP value.

With reference to the third aspect, in a possible implementation, the server determines, according to a method of least squares, a first antenna azimuth that has a smallest sum of squared errors with the antenna azimuth corresponding to the second RSRP value and the antenna azimuth corresponding to the fourth RSRP value. The server determines the first antenna azimuth as the antenna azimuth of the first base station.

With reference to the third aspect, in a possible implementation, the N RSRP values in the RSRP set corresponding to the first neighboring base station are: RSRP values that are of reference signals received by the first neighboring base station from the first base station and that are determined by the server through simulation when antenna azimuths of the first base station are the N antenna azimuths.

With reference to the third aspect, in a possible implementation, the K RSRP values in the RSRP set corresponding to the second neighboring base station are: RSRP values that are of reference signals received by the second neighboring base station from the first base station and that are determined by the server through the simulation when antenna azimuths of the first base station are the K antenna azimuths.

With reference to the third aspect, in a possible implementation, the server sends second indication information to the first neighboring base station, where the second indication information indicates the first neighboring base station to send the first RSRP value to the server.

With reference to the third aspect, in a possible implementation, the second indication information further indicates configuration information of the reference signal from the first base station.

According to a fourth aspect, an antenna positioning method for a first base station is provided. The method includes: A first neighboring base station of the first base station obtains a first RSRP value of the first base station. The first neighboring base station sends the first RSRP value to a server.

Based on the foregoing technical solution, the first neighboring base station can measure the first RSRP value of a reference signal from the neighboring base station of the first neighboring base station, and send the first RSRP value to the server, so that the server may determine an antenna azimuth of the first base station based on the first RSRP value.

With reference to the fourth aspect, in a possible implementation, the first neighboring base station receives second indication information from the server, where the second indication information indicates the first neighboring base station to send the first RSRP value to the server.

With reference to the fourth aspect, in a possible implementation, the second indication information further indicates configuration information of the reference signal from the first base station.

According to a fifth aspect, a communication apparatus is provided, including a communication unit and a processing unit. The communication unit is configured to receive a first RSRP value from a first base station, where the first RSRP value is an RSRP value that is measured by the first base station and that is of a reference signal from a first neighboring base station of the first base station. The processing unit is configured to determine an antenna azimuth of the first base station based on an RSRP set corresponding to the first neighboring base station and the first RSRP value, where the RSRP set corresponding to the first neighboring base station includes N RSRP values, the N RSRP values correspond to N antenna azimuths of the first base station, and N is a positive integer.

With reference to the fifth aspect, in a possible implementation, the processing unit is specifically configured to: determine a second RSRP value, where the second RSRP value is an RSRP value that is in the RSRP set corresponding to the first neighboring base station and that has a highest matching degree with the first RSRP value; and determine an antenna azimuth corresponding to the second RSRP value as the antenna azimuth of the first base station.

With reference to the fifth aspect, in a possible implementation, the second RSRP value is specifically: an RSRP value that is in the RSRP set corresponding to the first neighboring base station and that has a smallest difference from the first RSRP value.

With reference to the fifth aspect, in a possible implementation, the communication unit is further configured to receive a third RSRP value from the first base station, where the third RSRP value is an RSRP value that is measured by the first base station and that is of a reference signal from a second neighboring base station of the first base station.

The processing unit is further specifically configured to determine the antenna azimuth of the first base station based on the RSRP set corresponding to the first neighboring base station, an RSRP set corresponding to the second neighboring base station, the first RSRP value, and the third RSRP value. The RSRP set corresponding to the second neighboring base station includes K RSRP values, the K RSRP values correspond to K antenna azimuths of the first base station, and K is a positive integer.

With reference to the fifth aspect, in a possible implementation, the processing unit is further specifically configured to: determine a second RSRP value and a fourth RSRP value, where the second RSRP value is an RSRP value that is in the RSRP set corresponding to the first neighboring base station and that has a highest matching degree with the first RSRP value, and the fourth RSRP value is an RSRP value that is in the RSRP set corresponding to the second neighboring base station and that has a highest matching degree with the third RSRP value; and fit an antenna azimuth corresponding to the second RSRP value and an antenna azimuth corresponding to the fourth RSRP value, and determine the antenna azimuth of the first base station.

With reference to the fifth aspect, in a possible implementation, the second RSRP value is specifically: an RSRP value that is in the RSRP set corresponding to the first neighboring base station and that has a smallest difference from the first RSRP value; and the fourth RSRP value is specifically: an RSRP value that is in the RSRP set corresponding to the second neighboring base station and that has a smallest difference from the third RSRP value.

With reference to the fifth aspect, in a possible implementation, the processing unit is further specifically configured to: determine, according to a method of least squares, a first antenna azimuth that has a smallest sum of squared errors with the antenna azimuth corresponding to the second RSRP value and the antenna azimuth corresponding to the fourth RSRP value; and determine the first antenna azimuth as the antenna azimuth of the first base station.

With reference to the fifth aspect, in a possible implementation, the N RSRP values in the RSRP set corresponding to the first neighboring base station are: RSRP values that are of reference signals received by the first base station from the first neighboring base station and that are determined by a server through simulation when antenna azimuths of the first base station are the N antenna azimuths.

With reference to the fifth aspect, in a possible implementation, the K RSRP values in the RSRP set corresponding to the second neighboring base station are: RSRP values that are of reference signals received by the first base station from the second neighboring base station and that are determined by the server through the simulation when antenna azimuths of the first base station are the K antenna azimuths.

With reference to the fifth aspect, in a possible implementation, the communication unit is further specifically configured to send first indication information to the first base station, where the first indication information indicates the first base station to send the first RSRP value to the server.

With reference to the fifth aspect, in a possible implementation, the first indication information further indicates configuration information of the reference signal from the first neighboring base station.

According to a sixth aspect, a communication apparatus is provided, including a communication unit and a processing unit. The processing unit is configured to obtain a first RSRP value of a first neighboring base station of a first base station.

The communication unit is further configured to send the first RSRP value to a server.

With reference to the sixth aspect, in a possible implementation, the processing unit is further configured to obtain a third RSRP value of a reference signal from a second neighboring base station of the first base station; and the communication unit is further configured to send the third RSRP value to the server.

With reference to the sixth aspect, in a possible implementation, the communication unit is further configured to receive first indication information from the server, where the first indication information indicates the first base station to send the first RSRP value to the server.

With reference to the sixth aspect, in a possible implementation, the first indication information further indicates configuration information of a reference signal from the first neighboring base station.

According to a seventh aspect, a communication apparatus is provided, including a communication unit and a processing unit. The communication unit is configured to receive a first RSRP value from a first neighboring base station of a first base station, where the first RSRP value is an RSRP value that is measured by the first neighboring base station of the first base station and that is of a reference signal from the first base station.

The processing unit is configured to determine an antenna azimuth of the first base station based on an RSRP set corresponding to the first neighboring base station and the first RSRP value. The RSRP set corresponding to the first neighboring base station includes N RSRP values, the N RSRP values correspond to N antenna azimuths of the first base station, and N is a positive integer.

With reference to the seventh aspect, in a possible implementation, the processing unit is specifically configured to determine a second RSRP value, where the second RSRP value is an RSRP value that is in the RSRP set corresponding to the first neighboring base station and that has a highest matching degree with the first RSRP value.

The processing unit is specifically configured to determine an antenna azimuth corresponding to the second RSRP value as the antenna azimuth of the first base station.

With reference to the seventh aspect, in a possible implementation, the second RSRP value is specifically: an RSRP value that is in the RSRP set corresponding to the first neighboring base station and that has a smallest difference from the first RSRP value.

With reference to the seventh aspect, in a possible implementation, the communication unit is further configured to receive a third RSRP value from a second neighboring base station of the first base station, where the third RSRP value is an RSRP value that is measured by the second neighboring base station of the first base station and that is of a reference signal from the first base station. The processing unit is further specifically configured to determine the antenna azimuth of the first base station based on the RSRP set corresponding to the first neighboring base station, an RSRP set corresponding to the second neighboring base station, the first RSRP value, and the third RSRP value. The RSRP set corresponding to the second neighboring base station includes K RSRP values, the K RSRP values correspond to K antenna azimuths of the first base station, and K is a positive integer.

With reference to the seventh aspect, in a possible implementation, the processing unit is specifically configured to: determine a second RSRP value and a fourth RSRP value, where the second RSRP value is an RSRP value that is in the RSRP set corresponding to the first neighboring base station and that has a highest matching degree with the first RSRP value, and the fourth RSRP value is an RSRP value that is in the RSRP set corresponding to the second neighboring base station and that has a highest matching degree with the third RSRP value; and fit an antenna azimuth corresponding to the second RSRP value and an antenna azimuth corresponding to the fourth RSRP value, and determine the antenna azimuth of the first base station.

With reference to the seventh aspect, in a possible implementation, the second RSRP value is specifically: an RSRP value that is in the RSRP set corresponding to the first neighboring base station and that has a smallest difference from the first RSRP value.

The fourth RSRP value is specifically: an RSRP value that is in the RSRP set corresponding to the second neighboring base station and that has a smallest difference from the third RSRP value.

With reference to the seventh aspect, in a possible implementation, the processing unit is specifically configured to: determine, according to a method of least squares, a first antenna azimuth that has a smallest sum of squared errors with the antenna azimuth corresponding to the second RSRP value and the antenna azimuth corresponding to the fourth RSRP value; and determine the first antenna azimuth as the antenna azimuth of the first base station.

With reference to the seventh aspect, in a possible implementation, the N RSRP values in the RSRP set corresponding to the first neighboring base station are: RSRP values that are of reference signals received by the first neighboring base station from the first base station and that are determined by a server through simulation when antenna azimuths of the first base station are the N antenna azimuths.

With reference to the seventh aspect, in a possible implementation, the K RSRP values in the RSRP set corresponding to the second neighboring base station are: RSRP values that are of reference signals received by the second neighboring base station from the first base station and that are determined by the server through the simulation when antenna azimuths of the first base station are the K antenna azimuths.

With reference to the seventh aspect, in a possible implementation, the processing unit is further configured to send second indication information to the first neighboring base station, where the second indication information indicates the first neighboring base station to send the first RSRP value to the server.

With reference to the seventh aspect, in a possible implementation, the second indication information further indicates configuration information of the reference signal from the first base station.

According to an eighth aspect, a communication apparatus is provided, including a communication unit and a processing unit. The processing unit is configured to obtain a first RSRP value of a first base station. The communication unit is configured to send the first RSRP value to a server.

With reference to the eighth aspect, in a possible implementation, the communication unit is further configured to receive second indication information from the server, where the second indication information indicates a first neighboring base station to send the first RSRP value to the server.

With reference to the eighth aspect, in a possible implementation, the second indication information further indicates configuration information of a reference signal from the first base station.

According to a ninth aspect, this application provides a communication apparatus, including a processor, a storage medium, at least one processor, and an interface circuit. The interface circuit is configured to: receive a signal from another communication apparatus other than the communication apparatus and transmit the signal to the processor, or send a signal from the processor to another communication apparatus other than the communication apparatus. The processor is configured to implement, by using a logic circuit or executing code instructions, the method according to any one of the first aspect or the possible implementations of the first aspect. The communication apparatus may be a server, or may be a chip in the server.

According to a tenth aspect, this application provides a communication apparatus, including a processor, a storage medium, at least one processor, and an interface circuit. The interface circuit is configured to: receive a signal from another communication apparatus other than the communication apparatus and transmit the signal to the processor, or send a signal from the processor to another communication apparatus other than the communication apparatus. The processor is configured to implement, by using a logic circuit or executing code instructions, the method according to any one of the second aspect or the possible implementations of the second aspect. The communication apparatus may be a base station, or may be a chip in the base station.

According to an eleventh aspect, this application provides a communication apparatus, including a processor, a storage medium, at least one processor, and an interface circuit. The interface circuit is configured to: receive a signal from another communication apparatus other than the communication apparatus and transmit the signal to the processor, or send a signal from the processor to another communication apparatus other than the communication apparatus. The processor is configured to implement, by using a logic circuit or executing code instructions, the method according to any one of the third aspect or the possible implementations of the third aspect. The communication apparatus may be a server, or may be a chip in the server.

According to a twelfth aspect, this application provides a communication apparatus, including a processor, a storage medium, at least one processor, and an interface circuit. The interface circuit is configured to: receive a signal from another communication apparatus other than the communication apparatus and transmit the signal to the processor, or send a signal from the processor to another communication apparatus other than the communication apparatus. The processor is configured to implement, by using a logic circuit or executing code instructions, the method according to any one of the fourth aspect or the possible implementations of the fourth aspect. The communication apparatus may be a base station, or may be a chip in the base station.

According to a thirteenth aspect, this application provides a communication system, including a first communication apparatus and a second communication apparatus. The first communication apparatus is configured to perform the method according to any one of the first aspect or the possible implementations of the first aspect. The second communication apparatus is configured to perform the method according to any one of the second aspect or the possible implementations of the second aspect.

According to a fourteenth aspect, this application provides a communication system, including a third communication apparatus and a fourth communication apparatus. The third communication apparatus is configured to perform the method according to any one of the third aspect or the possible implementations of the third aspect. The fourth communication apparatus is configured to perform the method according to any one of the fourth aspect or the possible implementations of the fourth aspect.

According to a fifteenth aspect, this application provides a computer-readable storage medium. The computer-readable storage medium stores instructions. When the instructions are run on a server, the server is enabled to perform the method according to any one of the first aspect or the possible implementations of the first aspect.

According to a sixteenth aspect, this application provides a computer-readable storage medium. The computer-readable storage medium stores instructions. When the instructions are run on a base station, the base station is enabled to perform the method according to any one of the second aspect or the possible implementations of the second aspect.

According to a seventeenth aspect, this application provides a computer-readable storage medium. The computer-readable storage medium stores instructions. When the instructions are run on a server, the server is enabled to perform the method according to any one of the third aspect or the possible implementations of the third aspect.

According to an eighteenth aspect, this application provides a computer-readable storage medium. The computer-readable storage medium stores instructions. When the instructions are run on a base station, the base station is enabled to perform the method according to any one of the fourth aspect or the possible implementations of the fourth aspect.

According to a nineteenth aspect, this application provides a computer program product including instructions. When the computer program product runs on a server, the server is enabled to perform the method according to any one of the first aspect or the possible implementations of the first aspect.

According to a twentieth aspect, this application provides a computer program product including instructions. When the computer program product runs on a base station, the base station is enabled to perform the method according to any one of the second aspect or the possible implementations of the second aspect.

According to a twenty-first aspect, this application provides a computer program product including instructions. When the computer program product runs on a server, the server is enabled to perform the method according to any one of the third aspect or the possible implementations of the third aspect.

According to a twenty-second aspect, this application provides a computer program product including instructions. When the computer program product runs on a base station, the base station is enabled to perform the method according to any one of the fourth aspect or the possible implementations of the fourth aspect.

It should be understood that, descriptions of technical features, technical solutions, beneficial effect, or similar words in this application do not imply that all features and advantages can be implemented in any individual embodiment. On the contrary, it may be understood that, the descriptions of the features or the beneficial effect mean that at least one embodiment includes a specific technical feature, technical solution, or beneficial effect. Therefore, the descriptions of the technical features, the technical solutions, or the beneficial effect in this specification may not necessarily be specific to a same embodiment. Further, the technical features, the technical solutions, and the beneficial effect described in embodiments may be combined in any proper manner. A person skilled in the art may understand that an embodiment may be implemented without one or more specific technical features or technical solutions, or beneficial effect in a specific embodiment. In other embodiments, additional technical features and beneficial effect may be further identified in a specific embodiment that does not reflect all embodiments.

DESCRIPTION OF EMBODIMENTS

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words such as "example" or "for example" are used for representing giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a related concept in a specific manner.

Figure 1:
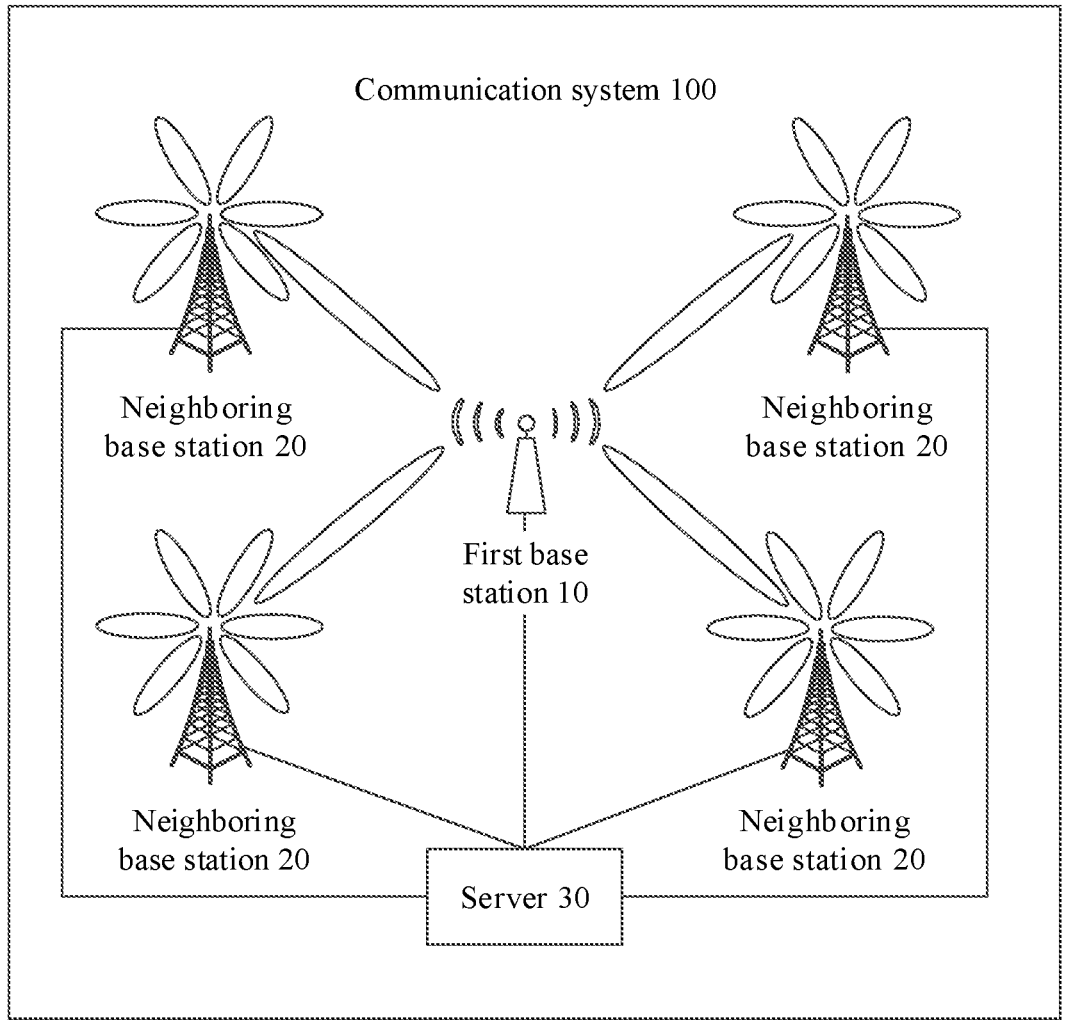
FIG. 1 is a diagram of a system architecture of a communication system according to an embodiment of this application.

An antenna positioning method for a first base station provided in embodiments of this application may be applied to a communication system 100 shown in FIG. 1.

As shown in FIG. 1, the communication system 100 includes a first base station 10 and T neighboring base stations 20 of the first base station. The communication system 100 further includes a server 30.

The server 30 has engineering parameter information of the first base station 10 and the T neighboring base stations 20. There is a communication link between the server 30 and both the first base station 10 and the neighboring base station 20. The server 30 communicates with the first base station 10 and the neighboring base station 20 by using the communication link. T is a positive integer.

In this embodiment of this application, the first base station has an RSRP measurement function. Similarly, the neighboring base station also has the RSRP measurement function.

The RSRP measurement function of the first base station and the neighboring base station may be implemented by using hardware or software. When the RSRP measurement function is implemented by using the software, the base station may have a function of receiving a signal from another base station by improving a baseband of the base station, so that the base station may measure an RSRP of the neighboring base station.

When the RSRP measurement function is implemented by using the hardware, an RSRP measurement apparatus may be added to the base station, to implement a function of measuring an RSRP of the neighboring base station.

To reduce hardware costs of the base station, in this embodiment of this application, the software is preferably used to implement the function of measuring the RSRP of the neighboring base station by the base station.

In this embodiment of this application, because a time division duplex (TDD) base station has a feature of consistency between an uplink channel and a downlink channel, based on the feature, the TDD base station can more easily implement the RSRP measurement function. Therefore, the base station (including the first base station and the neighboring base station) recorded in this embodiment of this application is preferably the TDD base station.

It should be noted that the RSRP in this application may be specifically an RSRP of a reference signal sent by a cell, for example, a channel state information reference signal (CSI-RS), a cell-specific reference signal (CRS), a synchronization signal and physical broadcast channel block (SSB), or another dedicated reference signal.

The communication system in embodiments of this application includes but is not limited to a long term evolution (LTE) system, a 5th-generation (5G) system, a new radio (NR) system, a wireless local area network (WLAN) system, a future evolved system, or a system converging a plurality of communication technologies. For example, a method provided in embodiments of this application may be specifically applied to an evolved-universal terrestrial radio access network (E-UTRAN) and a next generation-radio access network (NG-RAN) system.

A base station in embodiments of this application is a network-side entity configured to send a signal, receive a signal, or send a signal and receive a signal. The base station may be an apparatus that is deployed in a radio access network (RAN) and that provide a wireless communication function for a server, for example, a transmission reception point (TRP), a base station (for example, an evolved NodeB (eNB or eNodeB), a next generation node base station (gNB), or a next generation eNB (ng-eNB)), control nodes in various forms (for example, a network controller, a radio controller (for example, a radio controller in a cloud radio access network (CRAN) scenario)), a road side unit (RSU), or the like. Specifically, the base station may be a macro base station, a micro base station (also referred to as a small cell), a relay station, an access point (AP), or the like in various forms, or may be an antenna panel of a base station. The control node may be connected to a plurality of base stations, and configure resources for a plurality of servers within coverage of the plurality of base stations. In systems using different radio access technologies (RATs), names of devices having a base station function may be different. For example, the base station may be referred to as an eNB or an eNodeB in an LTE system, and may be referred to as a gNB in a 5G system or an NR system. A specific name of the base station is not limited in this application. The base station may alternatively be a base station in a future evolved public land mobile network (PLMN) or the like.

For example, the server in this embodiment of this application may be a core network element, configured to maintain and manage a network. For example, the server may be an operations, administration, and maintenance (OAM) device.

To make this application clearer, some concepts in this application are first briefly described.

1. Method of Least Squares

The method of least squares is a mathematical method that uses known data to solve unknown data. Data determined by using the method of least squares has a smallest sum of squared errors with the known data. The method of least squares is usually used to infer data closest to the real target data based on the known data.

For example, in this application, after the server determines M antenna azimuths of the first base station, the server may determine an optimal antenna azimuth based on the M antenna azimuths by using the method of least squares, so that a sum of squared errors between the M antenna azimuths and the optimal antenna azimuth is the smallest. The optimal antenna azimuth is an antenna azimuth of the first base station determined by the server.

The method of least squares may also be used for curve fitting, and a sum of squared errors between a curve fitted by using the method of least squares and a point formed by known data is the smallest.

2. Fitting

Fitting is a method of expressing a functional relation between a plurality of pieces of known data by using a function relational expression. When the plurality of pieces of known data exist, a function curve is obtained by fitting the plurality of pieces of known data, so that the function curve is close to each piece of known data on the whole. In a vivid way, fitting is to connect a series of points on a plane with a smooth curve. Because there are numerous possibilities for the curve, there are various fitting methods. A fitted curve may generally be represented by a function, and a fitting name varies according to the function (for example, a least square curve fitting method). The function relational expression obtained by fitting the known data can represent an implicit mathematical relationship between the data.

In order to solve a problem in a conventional technology that a workload of manually surveying a base station antenna is heavy, the following three manners may be used to determine information such as an antenna azimuth as well as longitude and latitude.

Manner 1

An apparatus for obtaining information about a base station antenna is provided, including: at least two receiving antenna units, configured to receive a satellite signal sent by a satellite in a satellite positioning system. The receiving antenna units and the base station antenna conform to a preset position relationship. A processing unit is configured to obtain position information of the receiving antenna units based on the satellite signal, and to obtain position information of the base station antenna based on the position information of the receiving antenna units and the preset position relationship between the receiving antenna units and the base station antenna. The preset position relationship may be that: a baseline formed by a connection line between the receiving antenna units and a normal of the base station antenna have a preset included angle relationship. A preset included angle value ranges from 0 degrees to 180 degrees. Preferably, the preset value may be 90 degrees or 0 degrees.

In manner 1, position information of two receiving antenna units is determined based on satellite signals received by the two receiving antenna units, and then position information of an antenna is calculated based on a preset position relationship between the two receiving antenna units and the antenna. However, in this manner, at least two additional receiving antenna units need to be added to a base station, and hardware costs are high.

Manner 2

A spatial pose of an antenna is determined in an aerial photography manner by using an uncrewed aerial vehicle. Details are as follows.

A camera is disposed on the uncrewed aerial vehicle, and the uncrewed aerial vehicle is controlled to arrive at two specified positions in front of the antenna. Two images of the antenna are respectively photographed at the two specified positions. A binocular vision system algorithm is used to calculate the spatial pose of the antenna based on the two images.

In manner 2, personnel do not need to climb to a pole of a base station to detect a spatial posture of an antenna. The personnel can determine the spatial posture of the antenna by taking two images that meet a requirement under the base station in the aerial photography manner by using the uncrewed aerial vehicle. However, in this method, the personnel still need to reach the base station, and the method also depends on manual participation of the personnel.

Manner 3

Location information of each terminal and a direction in which the terminal is located of a base station are obtained from a measurement reports (MR) reported by each of a plurality of terminals located within coverage of the target base station. The coverage of the base station is determined. The base station is divided into a plurality of zones based on a preset angle by using the base station as a center. A proportion of MR collection points in each zone is determined. An angle zone with a largest proportion of MR collection points is an optimal antenna azimuth of this sector based on user hotspot distribution. The optimal antenna azimuth and an antenna azimuth of the base station in a background antenna basic database are compared to find antenna feeder-related problems, such as reverse connection of an antenna feeder system, improper antenna coverage, and incorrect background antenna database.

In manner 3, an optimal antenna azimuth of a base station based on user hotspot distribution is determined by using MR information reported by a terminal. However, this manner depends on MR data of a user, and analysis can be performed only when a sufficient quantity of terminals report the MR data. Therefore, an application scenario is limited. In this method, the optimal antenna azimuth based on the user hotspot distribution is determined, but a current actual antenna azimuth of the base station cannot be determined. In the foregoing three manners, a base station cannot determine an antenna azimuth of the base station without depending on an external device.

To resolve a problem of low detection efficiency and high costs in the conventional technology when an antenna azimuth of a base station is manually detected, embodiments of this application provide an antenna positioning method for a first base station. A server establishes a corresponding RSRP set for a first neighboring base station of the first base station. The RSRP set corresponding to the first neighboring base station can represent a correspondence between an antenna azimuth of the first base station and an RSRP value that is measured by the first base station and that is of a reference signal from the first neighboring base station. In this way, the server can determine an actual antenna azimuth of the first base station based on the RSRP value that is actually measured by the first base station and that is of the reference signal from the first neighboring base station and the RSRP set corresponding to the first neighboring base station. In this method, personnel do not need to check an antenna azimuth of a base station on site, so that detection efficiency of detecting the antenna azimuth is improved and detection costs are reduced.

Figure 2:
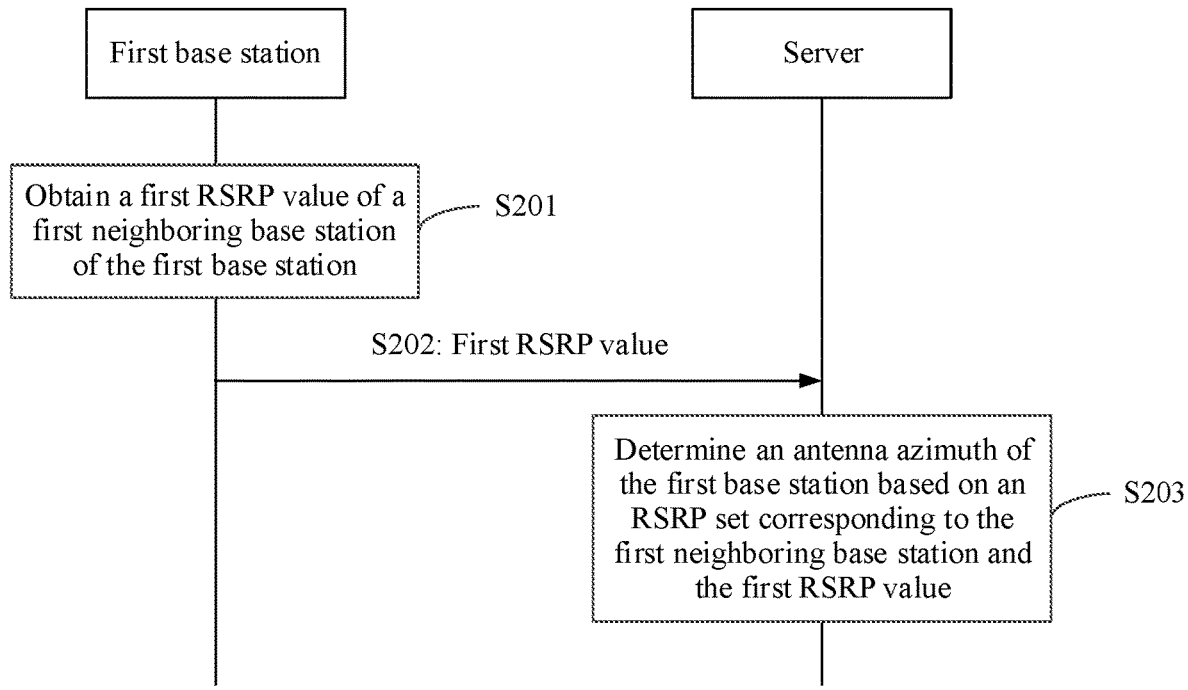
FIG. 2 is a schematic flowchart of an antenna positioning method for a first base station according to an embodiment of this application.

FIG. 2 shows an antenna positioning method for a first base station according to an embodiment of this application. The method includes the following steps.

S201: The first base station obtains a first RSRP value of a first neighboring base station of the first base station.

The first RSRP value is an RSRP value that is actually measured by the first base station and that is of a reference signal from the first neighboring base station.

In a possible implementation, the first base station may further obtain a third RSRP value of a reference signal from a second neighboring base station of the first base station. The third RSRP value is an RSRP value that is measured by the first base station and that is of a reference signal from the second neighboring base station of the first base station.

Generally, an RSRP value that is measured by the first base station and that is of a reference signal from a neighboring base station is related to an antenna azimuth of the first base station. The RSRP value that is measured by the first base station and that is of the reference signal from the neighboring base station generally varies with the antenna azimuth of the first base station.

S202: The first base station sends the first RSRP value to a server. Correspondingly, the server receives the first RSRP value from the first base station.

In a possible implementation, in addition to sending the first RSRP value to the server, the first base station may further send the third RSRP value to the server. Correspondingly, the server receives the first RSRP value and the third RSRP value from the first base station.

For a more specific implementation of S202, refer to the following descriptions in S301d.

S203: The server determines the antenna azimuth of the first base station based on an RSRP set corresponding to the first neighboring base station and the first RSRP value.

The RSRP set corresponding to the first neighboring base station includes N RSRP values, the N RSRP values correspond to N antenna azimuths of the first base station, and N is a positive integer.

In a specific implementation, the server determines, based on the first RSRP value, a second RSRP value from the RSRP set corresponding to the first neighboring base station. The second RSRP value is an RSRP value that is in the RSRP set corresponding to the first neighboring base station and that has a highest matching degree with the first RSRP value. Then, the server determines an antenna azimuth corresponding to the second RSRP value as the antenna azimuth of the first base station.

In a possible implementation, when the server receives the first RSRP value and the third RSRP value from the first base station, S203 may be implemented as follows: The server determines the antenna azimuth of the first base station based on the RSRP set corresponding to the first neighboring base station, an RSRP set corresponding to the second neighboring base station, the first RSRP value, and the third RSRP value. The RSRP set corresponding to the second neighboring base station includes K RSRP values, the K RSRP values correspond to K antenna azimuths of the first base station, and K is a positive integer.

Specifically, the server determines, based on the first RSRP value, the second RSRP value in the RSRP set corresponding to the first neighboring base station; and the server determines, based on the third RSRP value, a fourth RSRP value in the RSRP set corresponding to the second neighboring base station. The second RSRP value is the RSRP value that is in the RSRP set corresponding to the first neighboring base station and that has the highest matching degree with the first RSRP value, and the fourth RSRP value is an RSRP value that is in the RSRP set corresponding to the second neighboring base station and that has a highest matching degree with the third RSRP value.

The server fits the antenna azimuth corresponding to the second RSRP value and an antenna azimuth corresponding to the fourth RSRP value, and determines the antenna azimuth of the first base station.

Further, the second RSRP value is an RSRP value that is in the RSRP set corresponding to the first neighboring base station and that has a smallest difference from the first RSRP value, and the fourth RSRP value is an RSRP value that is in the RSRP set corresponding to the second neighboring base station and that has a smallest difference from the third RSRP value.

A process in which the server fits the antenna azimuth corresponding to the second RSRP value and the antenna azimuth corresponding to the fourth RSRP value, and determines the antenna azimuth of the first base station is as follows.

The server determines, according to a method of least squares, a first antenna azimuth that has a smallest sum of squared errors with the antenna azimuth corresponding to the second RSRP value and the antenna azimuth corresponding to the fourth RSRP value. The server determines the first antenna azimuth as the antenna azimuth of the first base station.

For a more specific implementation of S203, refer to the following descriptions in S301 and S302, or refer to the following descriptions in S1001, S1002, and S1003.

Based on the foregoing technical solution, the RSRP set corresponding to the first neighboring base station of the first base station includes the N RSRP values and the antenna azimuths corresponding to the N RSRP values. Therefore, when the N RSRP values are RSRP values that are measured by the first base station and that are of reference signals from the first neighboring base station, and the antenna azimuths corresponding to the RSRP values are antenna azimuths of the first base station, the RSRP set corresponding to the first neighboring base station can represent a correspondence between the antenna azimuth of the first base station and the RSRP value that is measured by the first base station. Based on this, the server may determine the actual antenna azimuth of the first base station based on the RSRP value that is actually measured by the first base station and that is of the reference signal from the first neighboring base station and the RSRP value. In this method, personnel do not need to check an antenna azimuth of a base station on site, so that detection efficiency of detecting the antenna azimuth is improved and detection costs are reduced.

In this embodiment of this application, the server may determine the antenna azimuth of the first base station based on one or more neighboring base stations of the first base station.

Figure 3:
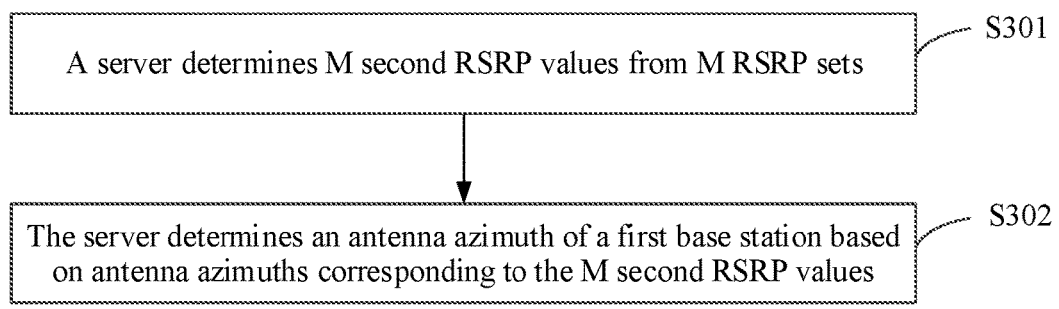
FIG. 3 is a schematic flowchart of another antenna positioning method for a first base station according to an embodiment of this application.

As shown in FIG. 3, an example in which a server determines an antenna azimuth of a first base station based on M neighboring base stations of the first base station is used for detailed description. M is a positive integer.

S301: The server determines M second RSRP values from M RSRP sets.

The M RSRP sets are in one-to-one correspondence with the M neighboring base stations of the first base station.

A first RSRP set in the M RSRP sets includes N RSRP values and N antenna azimuths, and the N RSRP values are in one-to-one correspondence with the N antenna azimuths.

The first RSRP set is an RSRP set corresponding to a first neighboring base station in the M RSRP sets.

A second RSRP value is an RSRP value that is in the N RSRP values in the first RSRP set and that has a highest matching degree with a first RSRP value, where both M and N are positive integers.

In a possible implementation, the N RSRP values in the first RSRP set are N RSRP values that are of reference signals from the first base station, that are measured by the first neighboring base station, and that are determined by the server through simulation when antenna azimuths of the first base station are the N antenna azimuths.

S302: The server determines the antenna azimuth of the first base station based on antenna azimuths corresponding to the M second RSRP values.

In a specific implementation, the server determines an antenna azimuth corresponding to each of the M second RSRP values. The server determines M antenna azimuths in total. The server determines the antenna azimuth of the first base station based on the M antenna azimuths.

Based on the foregoing technical solution, according to an antenna positioning method for the first base station provided in this embodiment of this application, the server respectively establishes the M RSRP sets for the M neighboring base stations of the first base station, and an RSRP value in each RSRP set corresponds to one antenna azimuth. The server determines the M second RSRP values from the M RSRP sets based on an RSRP value that is actually measured by the first base station and that is of the first neighboring base station, and further determines the antenna azimuth of the first base station based on the antenna azimuths corresponding to the M RSRP values.

In this way, according to the antenna positioning method for the first base station provided in this embodiment of this application, the server may determine the antenna azimuth of the first base station based on an RSRP value that is measured by the first base station and that is of a neighboring base station. Personnel do not need to check an antenna azimuth of a base station on site, so that detection efficiency of detecting the antenna azimuth is improved and detection costs are reduced.

Figure 4:
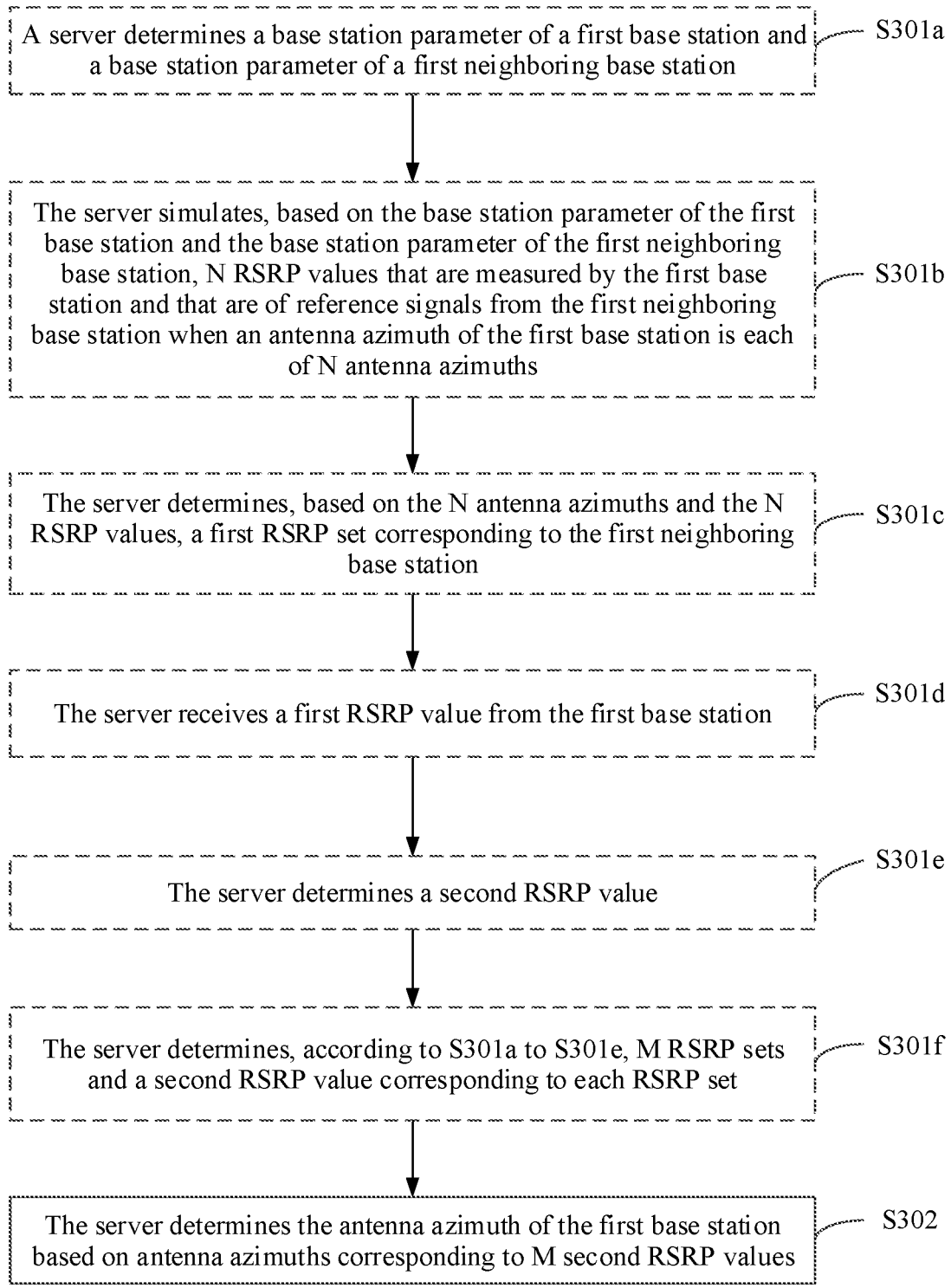
FIG. 4 is a schematic flowchart of another antenna positioning method for a first base station according to an embodiment of this application.

In a possible implementation, with reference to FIG. 3, as shown in FIG. 4, S301 may be specifically implemented through S301a to S301f. The following provides specific descriptions.

S301a: The server determines a base station parameter of the first base station and a base station parameter of the first neighboring base station.

The base station parameter of the first base station includes location information of the first base station.

The base station parameter of the first neighboring base station includes at least one of location information of the first neighboring base station, an antenna azimuth of the first neighboring base station, and an antenna pattern of the first neighboring base station.

It should be noted that there are a plurality of methods for the server to determine the location information of the first base station and the location information of the first neighboring base station.

For example, the server may determine the location information of the first base station and the location information of the first neighboring base station by using a triangulation location method.

For another example, the server may determine the location information of the first base station by using at least one parameter of a received signal strength indicator (RSSI), an angle of arrival (AOA), a time of arrival (TOA), a time difference of arrival (TDOA), or a signal strength difference of arrival (SSDOA).

For another example, the server may obtain engineering parameter information of the first base station and engineering parameter information of the first neighboring base station (where for example, engineering parameter information may include at least one parameter of location information of a base station, a base station type, and an antenna azimuth) from a network management system of the first base station and a network management system of the first neighboring base station. The server determines the location information of the first base station based on the engineering parameter information of the first base station, and determines the location information of the neighboring base station based on the engineering parameter information of the first neighboring base station.

It should be noted that, a network management system of a base station generally includes information about all base stations in an area. Therefore, the engineering parameter information of the first base station and the engineering parameter information of the first neighboring base station are generally in a same network management system.

The server recorded in this embodiment of this application may be a server that supports a network management system. In this way, the server may directly obtain the engineering parameter information of the first base station and the engineering parameter information of the first neighboring base station from the network management system.

The location information of the first base station and the location information of the first neighboring base station may be specifically embodied as at least one of the following: latitude and longitude of the first base station, latitude and longitude of the first neighboring base station, a distance between the first base station and the first neighboring base station, and a direction of the first base station relative to the first neighboring base station.

S301b: The server simulates, based on the base station parameter of the first base station and the base station parameter of the first neighboring base station, N RSRP values that are measured by the first base station and that are of reference signals from the first neighboring base station when antenna azimuths of the first base station are the N antenna azimuths.

In a specific implementation, the server determines a second antenna azimuth of the first base station. The second antenna azimuth is one of the N antenna azimuths recorded in S301.

The server performs the simulation based on at least one piece of the following information: the second antenna azimuth, a location of the first base station, a location of the first neighboring base station, the distance between the first base station and the first neighboring base station, a location of the first base station in the antenna pattern of the first neighboring base station, and interference of other neighboring base stations to the first neighboring base station, and determines an RSRP value that is measured by the first base station theoretically and that is of the reference signal from the first neighboring base station when the antenna azimuth of the first base station is the second antenna azimuth.

Based on the foregoing method, the server sequentially determines the N antenna azimuths of the first base station and the RSRP values corresponding to the N antenna azimuths.

S301c: The server determines, based on the N antenna azimuths and the N RSRP values, a first RSRP set corresponding to the first neighboring base station.

The first RSRP set includes the N RSRP values and the antenna azimuths corresponding to the N RSRP values.

In a specific implementation, for the N RSRP values in the first RSRP set, the server establishes a mapping relationship between each RSRP value and an antenna azimuth corresponding to the RSRP value, and the server stores the mapping relationship. Then, the server may determine, based on the mapping relationship, an antenna azimuth corresponding to each RSRP value.

S301d: The server receives a first RSRP value from the first base station.

Figure 5:
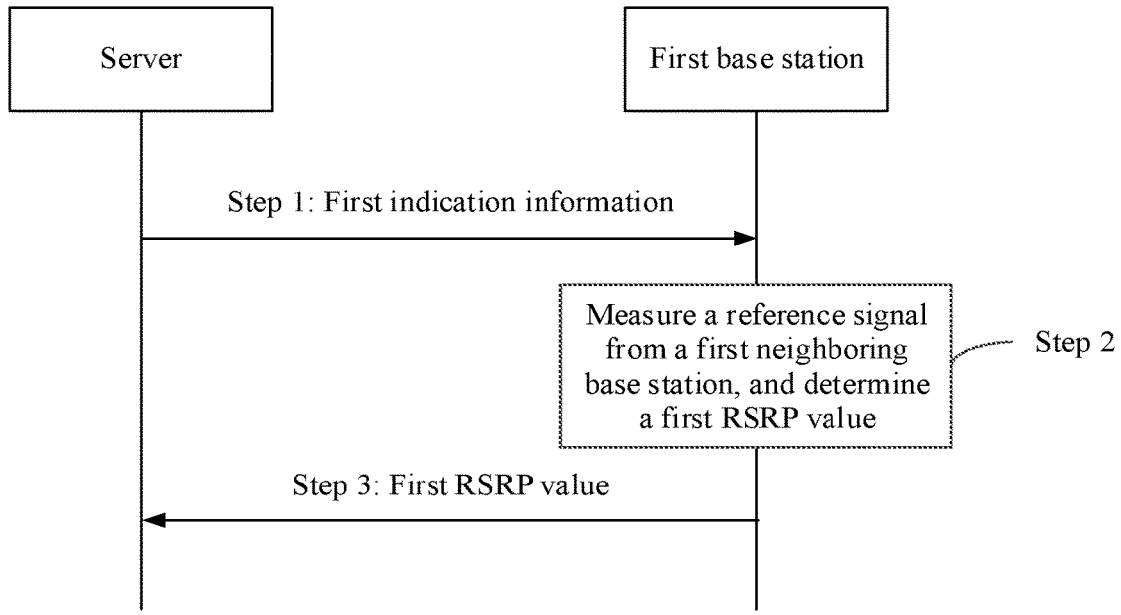
FIG. 5 is a schematic flowchart of another antenna positioning method for a first base station according to an embodiment of this application.

In a possible implementation, as shown in FIG. 5, S301d may be specifically implemented through the following step 1 to step 3.

Step 1: The server sends first indication information to the first base station. Correspondingly, the first base station receives the first indication information from the server. The first indication information indicates the first base station to send a first RSRP value to the server.

For example, the first indication information may include configuration information of a reference signal from the current first neighboring base station.

Step 2: The first base station measures the reference signal from the first neighboring base station, and determines the first RSRP value.

For example, the first base station may measure the reference signal from the first neighboring base station based on the configuration information of the reference signal from the current first neighboring base station, to obtain the first RSRP value.

Step 3: The first base station sends the first RSRP value to the server. Correspondingly, the server receives the first RSRP value from the first base station.

S301e: The server determines a second RSRP value.

The second RSRP value is an RSRP value that is in the RSRP set corresponding to the first neighboring base station and that has a highest matching degree with the first RSRP value.

In an implementation, the second RSRP value is specifically: an RSRP value that is in the RSRP set corresponding to the first neighboring base station and that has a smallest difference from the first RSRP value. In other words, an RSRP value that has a highest matching degree with the first RSRP value refers to an RSRP value that has a smallest difference from the first RSRP value.

S301f: The server determines, according to S301a to S301e, M RSRP sets and a second RSRP value corresponding to each RSRP set.

Specifically, the server repeatedly performs S301a to S301c to determine an RSRP set corresponding to each of M neighboring base stations of the first base station. For each RSRP set, the server performs S301d and S301e to determine a second RSRP value in each RSRP set.

It should be noted that S301a to S301c are a process in which the server determines the RSRP set corresponding to each neighboring base station; and S301d to S301f are a process in which the server determines the antenna azimuth of the first base station in real time.

S301a to S301c may be steps performed by the server in advance, or may be steps performed by the server in real time. Specifically, the server may determine, based on a computing capability of the server, whether to perform S301a to S301c in advance or perform S301a to S301c in real time.

For example, when the computing capability of the server is weak, the server performs S301a to S301c in advance, to train the RSRP set corresponding to each neighboring base station in advance. In this way, when the server determines the antenna azimuth of the first base station, a calculation amount of the server can be reduced by invoking the RSRP set corresponding to each neighboring base station that is trained in advance.

When the computing capability of the server is strong, the server performs S301a to S301c in real time. This can improve consistency between an RSRP value in the RSRP set and an RSRP value that is actually measured, and therefore improves accuracy of a calculation result.

Based on the foregoing technical solutions, the server determines, by using a simulation method, RSRPs that are of a neighboring base station and that are measured by the first base station at different antenna azimuths, and determines, based on the different antenna azimuths and the corresponding RSRPs, an RSRP set corresponding to the neighboring base station, so that personnel are prevented from measuring, on site, the RSRPs that are measured by the first base station at the different antenna azimuths and that are of the neighboring base station.

In another possible implementation of S301, the N RSRP values corresponding to the N antenna azimuths may be measured by personnel in advance. For example, when the first base station is deployed, the personnel adjust an antenna azimuth to determine an RSRP that is actually measured by the base station and that is of the first neighboring base station. In this way, the personnel determine the N RSRP values corresponding to the N antenna azimuths, and input the N antenna azimuths and the N RSRP values into the server. The server determines, through fitting based on the N antenna azimuths and the N RSRP values, the RSRP set corresponding to the first neighboring base station.

The manner of on-site actual measurement by the personnel enables the fitted RSRP set to be more accurate, and measurement during the base station deployment can avoid a case in which the personnel arrive at the base station for multiple times for the on-site measurement.

In an implementation of S302, a value of M includes two cases: M is equal to 1 (which is denoted as Case 1) and M is greater than 1 (which is denoted as Case 2). In the two cases, the server determines the antenna azimuth of the first base station by using different methods, which are separately described below.

Case 1: M is equal to 1.

In this case, the server determines one antenna azimuth in total. The server determines that the antenna azimuth is the antenna azimuth of the first base station.

It should be noted that, in this case, the server determines a first RSRP set for a neighboring base station of the first base station. The server determines that a second RSRP value is an RSRP value that is in the first RSRP set and that has a smallest absolute value of a difference from a first RSRP value. The server determines an antenna azimuth corresponding to the second RSRP value as the antenna azimuth of the first base station.

Case 2: M is greater than 1.

In this case, the server determines the antenna azimuth of the first base station based on the M antenna azimuths by using a method of least squares.

For example, the value of M is 10, and the server determines that the M antenna azimuths are respectively 52°, 55°, 51°, 53°, 54°, 52°, 55°, 56°, 50° and 53°.

The server determines, according to the method of least squares, that an arithmetic mean that enables a sum of squared errors of the 10 antenna azimuths to be the smallest is 51.1°, and then the server determines that the antenna azimuth of the first base station is 51.1°.

Based on the foregoing technical solution, when values of M are different, the server may select a corresponding method to determine the antenna azimuth of the first base station based on the different values of M.

It should be noted that, generally, when the value of M is greater than 3, an effect of determining the antenna azimuth of the first base station is better. The neighboring base station of the first base station recorded in this application is preferably a neighboring base station located in a coverage area directly in front of the antenna of the first base station.

In a possible implementation, a value of N in this embodiment of this application may be 360. In this way, during actual fitting, the server may perform simulation for antenna azimuths that range from 0° to 359°, to obtain an RSRP value corresponding to each of the antenna azimuths that are of the first base station and that range from 0° to 359°. In this way, the antenna azimuth of the first base station determined by the server can be more accurate.

Alternatively, the value of N may be an integer multiple of 360. The N antenna azimuths are evenly distributed in a 360° antenna azimuth of the first base station.

It should be noted that the value of N being 360 or the integer multiple of 360 is only a preferred implementation, and the value of N in this embodiment of this application may be any integer. This is not limited in this application.

In a possible implementation, the M neighboring base stations of the first base station recorded in this embodiment of this application are any M neighboring base stations in L neighboring base stations of the first base station. Alternatively, the M neighboring base stations of the first base station are M neighboring base stations that are in L neighboring base stations of the first base station and that meet a preset condition. L is a positive integer greater than or equal to M.

When L is equal to M, the M neighboring base stations of the first base station are all neighboring base stations of the first base station. When L is greater than M, the M neighboring base stations of the first base station are any part of all neighboring base stations of the first base station, or the M neighboring base stations of the first base station are neighboring base stations that are in all neighboring base stations of the first base station and that meet the preset condition.

It should be noted that, when the M neighboring base stations of the first base station are the neighboring base stations that are in all the neighboring base stations of the first base station and that meet the preset condition, the preset condition may be at least one of the following: a difference between a maximum value and a minimum value of N RSRP values of the neighboring base station is greater than a first preset value, a difference between RSRP values corresponding to adjacent antenna azimuths is less than a second preset value, or a deviation between an RSRP value curve formed by the N RSRP values and a standard RSRP value fluctuation curve is less than a third preset value.

When the M neighboring base stations of the first base station are the neighboring base stations that are in all the L neighboring base stations of the first base station and that meet the preset condition, scenarios in which the server determines the M neighboring base stations from the L neighboring base stations include the following two scenarios: Scenario a and Scenario b. The following separately describes the two scenarios.

Scenario a: The server determines, based on a difference between a maximum value and a minimum value of RSRP values and a difference between RSRP values corresponding to adjacent antenna azimuths, whether a neighboring base station meets the preset condition.

Specifically, if the server determines that a difference between a maximum value and a minimum value of RSRPs in an RSRP set is greater than the first preset value, and the difference between the RSRP values corresponding to the adjacent antenna azimuths is less than the second preset value, the server determines that the RSRP set is an RSRP set that meets the preset condition. Correspondingly, the server determines that a neighboring base station corresponding to the RSRP set is one of the M neighboring base stations.

If the server determines that a difference between a maximum value and a minimum value of RSRPs in an RSRP set is less than or equal to the first preset value, or the difference between the RSRP values corresponding to the adjacent antenna azimuths is greater than or equal to the second preset value, the server determines that the RSRP set is an RSRP set that does not meet the preset condition. Correspondingly, the server determines that a neighboring base station corresponding to the RSRP set is not one of the M neighboring base stations.

It should be noted that, if the difference between the maximum value and the minimum value of the RSRP values is greater than the first preset value, it indicates that the RSRP values that are of the neighboring base station, that are measured by the first base station, and that are obtained through simulation change clearly at different antenna azimuths. That is, the antenna azimuth has a clear impact on the RSRP value.

If the difference between the RSRP values corresponding to the adjacent antenna azimuths is less than the second preset value, it indicates that the RSRP values that are of the neighboring base station, that are measured by the first base station, and that are obtained through the simulation change smoothly with the antenna azimuths, and a simulation result is accurate. If the difference between the RSRP values corresponding to the adjacent antenna azimuths is greater than or equal to the second preset value, a simulation result may be incorrect, and the server does not use the simulation result.

In an example, the server determines that an RSRP set includes 10 RSRP values: −69 dBm, −79 dBm, −87 dBm, −96 dBm, −104 dBm, −115 dBm, −108 dBm, −96 dBm, −88 dBm, −75 dBm and −62 dBm. Antenna azimuths corresponding to the 10 RSRPs are respectively 0°, 36°, 72°, 108°, 144°, 180°, 216°, 252°, 288° and 324°.

Based on the RSRP set, the server determines that a difference between a maximum value −62 dBm and a minimum value −115 dBm of RSRPs in the 10 RSRP values is large. This can clearly represent that a difference between RSRP values received by an antenna is large at different antenna azimuths, and a signal strength difference is clear. In addition, the 10 RSRP values gradually decrease to both sides by using −62 dBm as a center, which basically complies with a rule of the RSRP values received by the antenna changing at the different antenna azimuths, and the server determines the RSRP set as an RSRP set that meets the preset condition. The server determines that a neighboring base station corresponding to the RSRP set is one of the M neighboring base stations.

In another example, the server determines that an RSRP set includes 10 RSRP values: −115 dBm, −134 dBm, −121 dBm, −118 dBm, −125 dBm, −109 dBm, −117 dBm, −112 dBm, −122 dBm, −115 dBm and −130 dBm. Antenna azimuths corresponding to the 10 RSRPs are respectively 0°, 36°, 72°, 108°, 144°, 180°, 216°, 252°, 288° and 324°.

Based on the RSRP set, the server determines that all RSRP values in the RSRP set are RSRP values with poor signal quality, and a rule of RSRPs changing with antenna azimuths does not conform to a rule of RSRP values received by an antenna changing at different antenna azimuths. In this case, the server determines that the RSRP set is an RSRP set that does not meet the preset condition. The server determines that a neighboring base station corresponding to the RSRP set is not one of the M neighboring base stations.

Scenario b: The server determines, based on an RSRP value curve, whether a neighboring base station meets the preset condition.

The scenario specifically includes the following I to VII.

I. The server determines an RSRP set corresponding to each of the L neighboring base stations of the first base station.

The server determines L RSRP sets in total. Each of the L RSRP sets includes a plurality of RSRP values, and each RSRP value corresponds to one antenna azimuth.

II. For any RSRP set in the L RSRP sets, the server determines an RSRP value in the RSRP set and an antenna azimuth corresponding to the RSRP value.

III. The server establishes a plane rectangular coordinate system.

A horizontal coordinate of the plane rectangular coordinate system is an antenna azimuth, and a vertical coordinate is an RSRP value. Alternatively, a horizontal coordinate of the plane rectangular coordinate system is an antenna azimuth, and a vertical coordinate is an RSRP value.

IV. The server maps the RSRP value in the any RSRP set and the antenna azimuth corresponding to the RSRP value to the plane rectangular coordinate system.

V. The server determines, based on a location of each point in the coordinate system, an RSRP fluctuation curve corresponding to the neighboring base station.

VI. The server determines, based on a similarity between the RSRP fluctuation curve and a standard RSRP fluctuation curve, whether the neighboring base station meets the preset condition.

In a specific implementation, when the server determines that the similarity between the RSRP fluctuation curve and the standard RSRP fluctuation curve is greater than a first similarity, the neighboring base station meets the preset condition. When the server determines that the similarity between the RSRP fluctuation curve and the standard RSRP fluctuation curve is less than or equal to the first similarity, the neighboring base station does not meet the preset condition.

In a possible implementation, different standard RSRP fluctuation curves are set for different neighboring base stations. For example, a standard RSRP fluctuation curve of a neighboring base station is set based on a base station type (macro base station or micro base station) of the neighboring base station, a distance between the neighboring base station and the first base station, and an interference factor of other neighboring base stations to the neighboring base station.

VII. The server repeatedly performs the foregoing II to VI until it is determined whether each of the L neighboring base stations meets the preset condition.

It should be noted that, before determining the RSRP sets corresponding to the L neighboring base stations, the server may further exclude, from the L neighboring base stations based on at least one of a distance between the first base station and each of the L neighboring base station and a relative location relationship between the first base station and each of the L neighboring base stations, a part of base stations that do not meet a condition.

For example, the server sets corresponding preset distances for different types of base stations. When a distance between a base station of a type and the first base station exceeds a corresponding preset distance, the server determines not to simulate an RSRP set corresponding to the base station, and the first base station does not need to measure an RSRP value of a reference signal from the base station.

For another example, the server determines a location relationship between a neighboring base station and the first base station. The server determines a theoretical optimal antenna azimuth of the first base station. The server determines whether the neighboring base station is located within the coverage area directly in front of the antenna of the first base station. If the neighboring base station is located in the coverage area directly in front of the antenna, the server determines to simulate an RSRP set corresponding to the base station, and the first base station measures an RSRP value of a reference signal from the base station. If the neighboring base station is not located in the coverage area directly in front of the antenna, the server determines not to simulate an RSRP set corresponding to the base station, and the first base station does not need to measure an RSRP value of a reference signal from the base station.

In a possible implementation, after the antenna azimuth of the first base station is determined according to the foregoing method, an actual antenna azimuth of the first base station is determined by using manual measurement in a conventional technology, and a difference between the antenna azimuth calculated and determined by the server and the actual antenna azimuth of the first base station is further determined.

When the server subsequently determines the antenna azimuth of the first base station, the server further considers the difference based on the calculated antenna azimuth. In this way, a final calculation result is closer to the actual antenna azimuth of the first base station.

The foregoing describes a method in which the server determines the antenna azimuth of the first base station based on the simulated RSRP value that is measured by the first base station and that is from the neighboring base station and the RSRP value that is actually measured by the first base station and that is from the neighboring base station.

Figure 6:
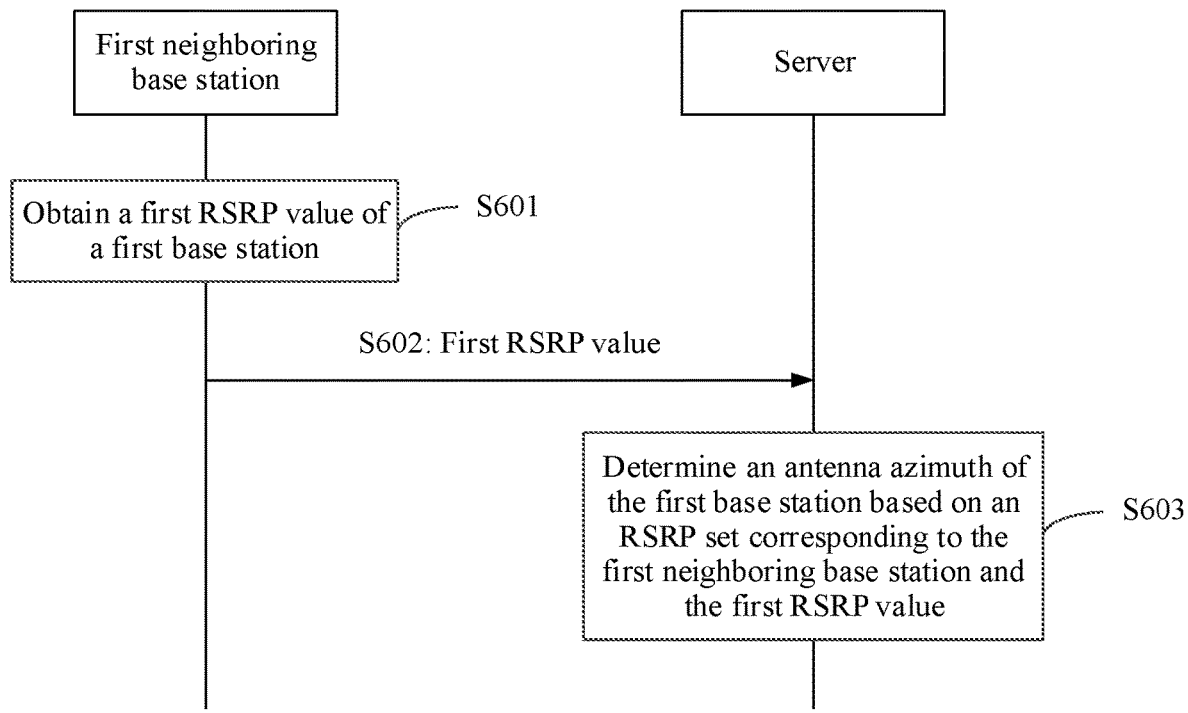
FIG. 6 is a schematic flowchart of another antenna positioning method for a first base station according to an embodiment of this application.

In addition, an embodiment of this application further provides a method in which a server determines an antenna azimuth of a first base station based on a simulated RSRP value that is measured by a neighboring base station and that is of the first base station and an RSRP value that is actually measured by the neighboring base station and that is of the first base station. As shown in FIG. 6, the method specifically includes the following steps.

S601: A first neighboring base station of the first base station obtains a first RSRP value of the first base station.

The first RSRP value is an RSRP value that is actually measured by the first neighboring base station and that is of a reference signal from the first base station.

In a possible implementation, a second neighboring base station of the first base station may further obtain a third RSRP value of a reference signal from the first base station. The third RSRP value is an RSRP value that is measured by the second neighboring base station and that is of the reference signal from the first base station.

Generally, an RSRP value that is measured by a neighboring base station and that is of a reference signal from the first base station is related to the antenna azimuth of the first base station. The RSRP value that is measured by the neighboring base station and that is of the reference signal from the first base station generally varies with the antenna azimuth of the first base station.

S602: The first neighboring base station sends the first RSRP value to the server. Correspondingly, the server receives the first RSRP value from the first neighboring base station of the first base station.

In a possible implementation, the first neighboring base station sends the first RSRP value to the server, and the second neighboring base station sends the third RSRP value to the server. Correspondingly, the server receives the first RSRP value from the first neighboring base station, and receives the third RSRP value from the second neighboring base station.

For a more specific implementation of S602, refer to the following description in S701d.

S603: The server determines the antenna azimuth of the first base station based on an RSRP set corresponding to the first neighboring base station and the first RSRP value.

The RSRP set corresponding to the first neighboring base station includes N RSRP values, the N RSRP values correspond to N antenna azimuths of the first base station, and N is a positive integer.

In a specific implementation, the server determines, based on the first RSRP value, a second RSRP value from the RSRP set corresponding to the first neighboring base station. The second RSRP value is an RSRP value that is in the RSRP set corresponding to the first neighboring base station and that has a highest matching degree with the first RSRP value. Then, the server determines an antenna azimuth corresponding to the second RSRP value as the antenna azimuth of the first base station.

In a possible implementation, when the server receives the first RSRP value from the first neighboring base station and the third RSRP value from the second neighboring base station, S603 may be implemented as follows: The server determines the antenna azimuth of the first base station based on the RSRP set corresponding to the first neighboring base station, an RSRP set corresponding to the second neighboring base station, the first RSRP value, and the third RSRP value. The RSRP set corresponding to the second neighboring base station includes K RSRP values, the K RSRP values correspond to K antenna azimuths of the first base station, and K is a positive integer.

Specifically, the server determines, based on the first RSRP value, the second RSRP value in the RSRP set corresponding to the first neighboring base station; and the server determines, based on the third RSRP value, a fourth RSRP value in the RSRP set corresponding to the second neighboring base station. The second RSRP value is the RSRP value that is in the RSRP set corresponding to the first neighboring base station and that has the highest matching degree with the first RSRP value, and the fourth RSRP value is an RSRP value that is in the RSRP set corresponding to the second neighboring base station and that has a highest matching degree with the third RSRP value.

The server fits the antenna azimuth corresponding to the second RSRP value and an antenna azimuth corresponding to the fourth RSRP value, and determines the antenna azimuth of the first base station.

Further, the second RSRP value is an RSRP value that is in the RSRP set corresponding to the first neighboring base station and that has a smallest difference from the first RSRP value.

The fourth RSRP value is an RSRP value that is in the RSRP set corresponding to the second neighboring base station and that has a smallest difference from the third RSRP value.

A process that the server fits the antenna azimuth corresponding to the second RSRP value and an antenna azimuth corresponding to the fourth RSRP value, and determines the antenna azimuth of the first base station is as follows.

The server determines, according to a method of least squares, a first antenna azimuth that has a smallest sum of squared errors with the antenna azimuth corresponding to the second RSRP value and the antenna azimuth corresponding to the fourth RSRP value.

The server determines the first antenna azimuth as the antenna azimuth of the first base station.

For a more specific implementation of S603, refer to the following descriptions in S701 and S702, or refer to the following descriptions in S1201, S1202, and S1203.

Based on the foregoing technical solution, the RSRP set corresponding to the first neighboring base station of the first base station includes the N RSRP values and the antenna azimuths corresponding to the N RSRP values. Therefore, when the N RSRP values are RSRP values that are measured by the first neighboring base station and that are of reference signals from the first base station, and the antenna azimuths corresponding to the RSRP values are antenna azimuths of the first base station, the RSRP set corresponding to the first neighboring base station can represent a correspondence between the antenna azimuth of the first base station and the RSRP value that is measured by the first neighboring base station and that is of the first base station. Based on this, the server may determine an actual antenna azimuth of the first base station based on the RSRP value that is actually measured by the first neighboring base station and that is of the reference signal from the first base station and the RSRP value. In this method, personnel do not need to check an antenna azimuth of a base station on site, so that detection efficiency of detecting the antenna azimuth is improved and detection costs are reduced.

In this embodiment of this application, the server may determine the antenna azimuth of the first base station based on one or more neighboring base stations of the first base station.

Figure 7:
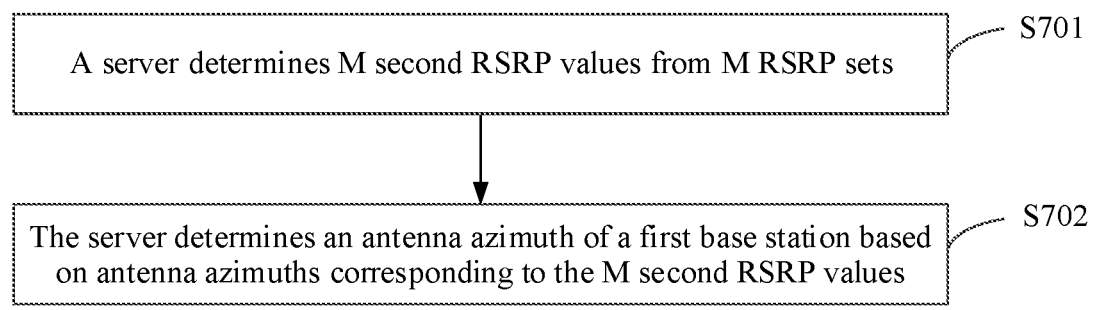
FIG. 7 is a schematic flowchart of another antenna positioning method for a first base station according to an embodiment of this application.

As shown in FIG. 7, an example in which a server determines an antenna azimuth of a first base station based on M neighboring base stations of the first base station is used for detailed description. M is a positive integer.

S701: The server determines M second RSRP values from M RSRP sets.

The M RSRP sets are in one-to-one correspondence with the M neighboring base stations of the first base station.

A first RSRP set in the M RSRP sets includes N RSRP values and N antenna azimuths, and the N RSRP values are in one-to-one correspondence with the N antenna azimuths. The first RSRP set is an RSRP set corresponding to a first neighboring base station in the M RSRP sets.

A second RSRP value is an RSRP value that is in the N RSRP values in the first RSRP set and that has a highest matching degree with a first RSRP value.

The first neighboring base station is a neighboring base station that is in the M neighboring base stations and that corresponds to the first RSRP set. Both M and N are positive integers.

In a possible implementation, the N RSRP values in the first RSRP set are simulated N RSRP values that are measured by the first neighboring base station and that are of reference signals from the first base station when antenna azimuths of the first base station are the N antenna azimuths.

S702: The server determines the antenna azimuth of the first base station based on antenna azimuths corresponding to the M second RSRP values.

An implementation of S702 is similar to that of S302. Details are not described herein again in this application.

Based on the foregoing technical solution, according to an antenna positioning method for the first base station provided in this embodiment of this application, the server respectively establishes the M RSRP sets for the M neighboring base stations of the first base station, and each RSRP value in the RSRP sets corresponds to one antenna azimuth. The server determines the first RSRP value, determines, from the M RSRP sets, the M second RSRP values that each has a highest matching degree with the first RSRP value, and further determines the antenna azimuth of the first base station based on the antenna azimuths corresponding to the M RSRP values.

In this way, according to the antenna positioning method for the first base station provided in this embodiment of this application, the server may determine the antenna azimuth of the first base station based on an RSRP value that is measured by a neighboring base station and that is of a reference signal from the first base station. In this method, personnel do not need to check an antenna azimuth of a base station on site, so that detection efficiency of detecting the antenna azimuth is improved and detection costs are reduced.

Figure 8:
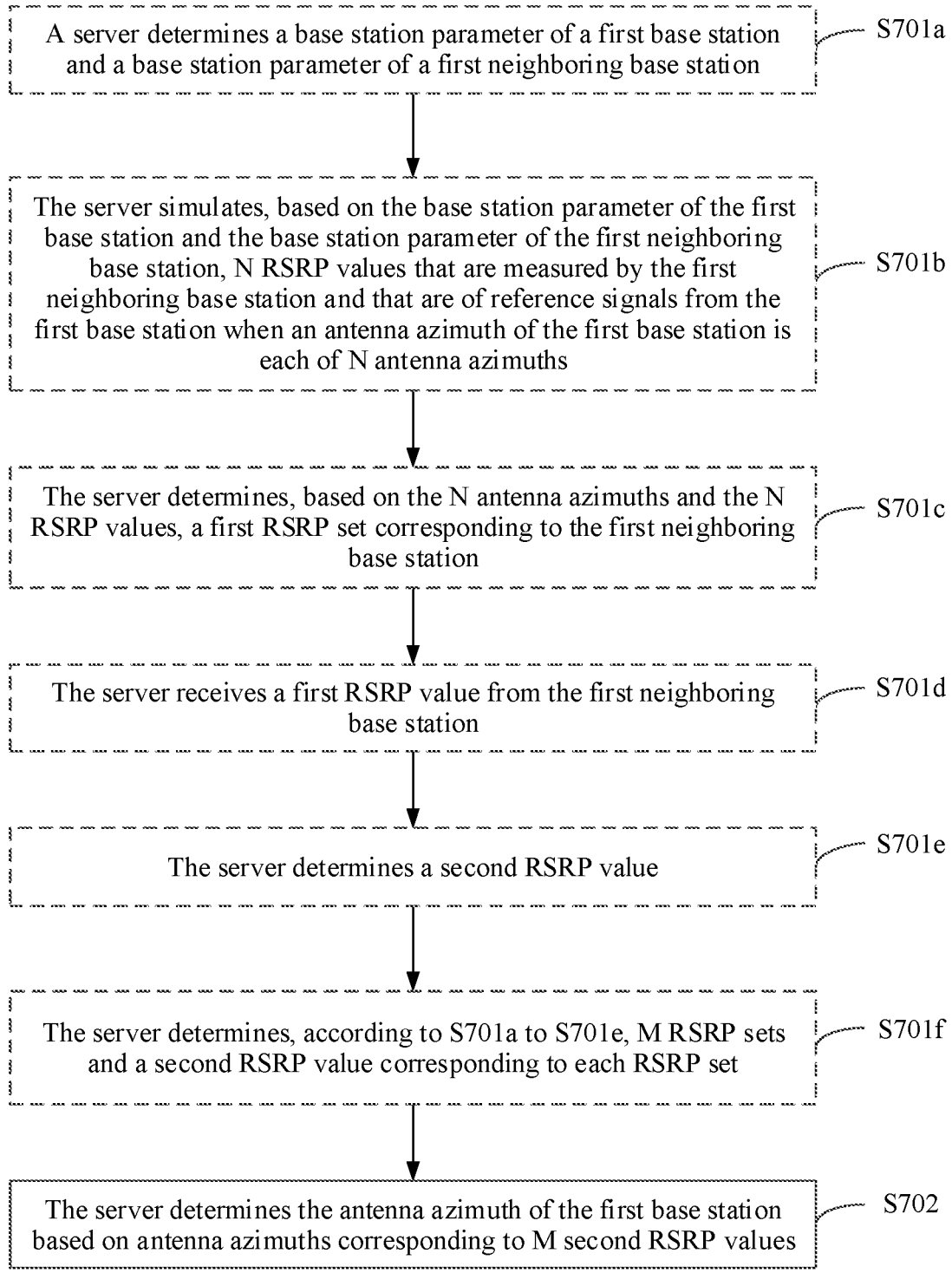
FIG. 8 is a schematic flowchart of another antenna positioning method for a first base station according to an embodiment of this application.

In a possible implementation, with reference to FIG. 7, as shown in FIG. 8, S701 may be specifically implemented by using S701a to S701f. The following provides specific descriptions.

S701a: The server determines a base station parameter of the first base station and a base station parameter of the first neighboring base station.

A specific implementation of S701a is similar to that of S301a. For the specific implementation of S701a, refer to S301a. Details are not described herein again.

S701b: The server simulates, based on the base station parameter of the first base station and the base station parameter of the first neighboring base station, N RSRP values that are measured by the first neighboring base station and that are of reference signals from the first base station when antenna azimuths of the first base station are the N antenna azimuths.

In a specific implementation, the server determines a third antenna azimuth of the first base station. The third antenna azimuth is one of the N antenna azimuths recorded in S701.

The server performs the simulation based on at least one of the third antenna azimuth, a location of the first base station, a location of the first neighboring base station, a distance between the first base station and the first neighboring base station, a location of the first base station in an antenna pattern of the first neighboring base station, and interference of other neighboring base stations to the first neighboring base station, and determines an RSRP value that is of the first base station and that can be measured by the first neighboring base station theoretically and when the antenna azimuth of the first base station is the third antenna azimuth.

Based on the foregoing method, the server sequentially determines the N antenna azimuths of the first base station and the RSRP values corresponding to the N antenna azimuths.

S701c: The server determines, based on the N antenna azimuths and the N RSRP values, a first RSRP set corresponding to the first neighboring base station.

A specific implementation of S701c is similar to that of S301c. For the specific implementation of S701c, refer to S301c. Details are not described herein again.

S701d: The server receives a first RSRP value from the first neighboring base station.

Figure 9:
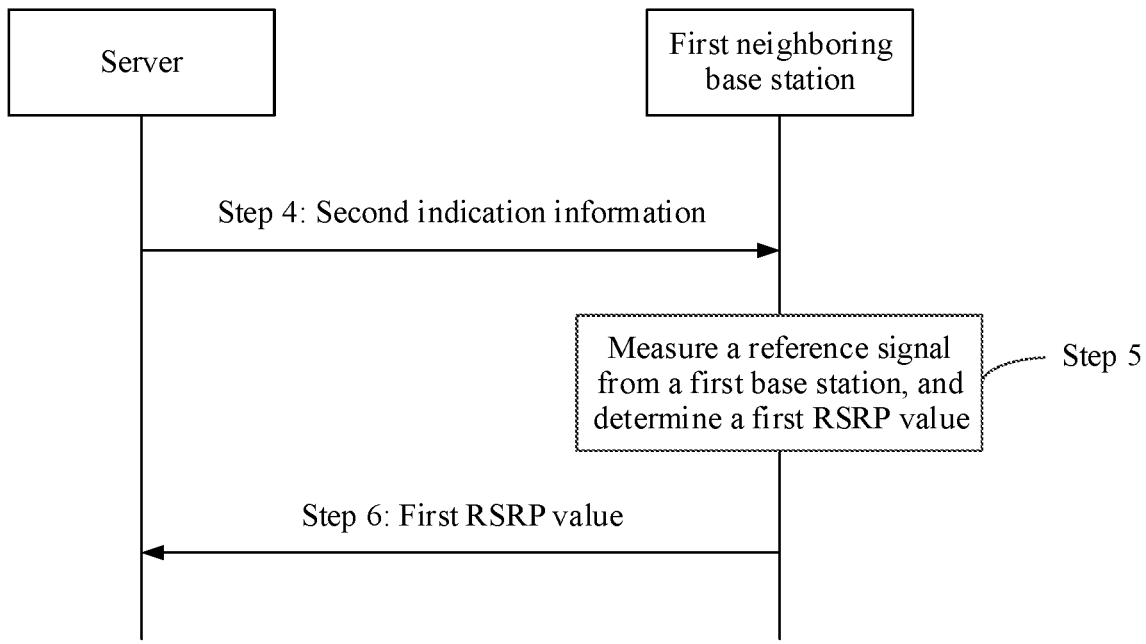
FIG. 9 is a schematic flowchart of another antenna positioning method for a first base station according to an embodiment of this application.

In a possible implementation, as shown in FIG. 9, S701d may be specifically implemented by using the following step 4 to step 6.

Step 4: The server sends second indication information to the first neighboring base station. Correspondingly, the first neighboring base station receives the second indication information from the server. The second indication information indicates the first neighboring base station to report the first RSRP value.

For example, the second indication information may include configuration information of a reference signal from the current first base station.

Step 5: The first neighboring base station measures the reference signal from the first base station, and determines the first RSRP value.

For example, the first neighboring base station may measure a reference signal from the first base station based on the configuration information of the reference signal from the current first base station, to obtain the first RSRP value.

Step 6: The first neighboring base station sends the first RSRP value to the server. Correspondingly, the server receives the first RSRP value from the first neighboring base station.

S701e: The server determines a second RSRP value.

The second RSRP value is an RSRP value that is in the RSRP set corresponding to the first neighboring base station and that has a highest matching degree with the first RSRP value.

In a specific implementation, the second RSRP value is specifically: an RSRP value that is in the RSRP set corresponding to the first neighboring base station and that has a smallest difference from the first RSRP value. In other words, an RSRP value that has the highest matching degree with the first RSRP value refers to an RSRP value that has the smallest difference from the first RSRP value.

S701f: The server determines, according to S701a to S701e, M RSRP sets and a second RSRP value corresponding to each RSRP set.

A specific implementation of S701f is similar to that of S301f. For the specific implementation of S701f, refer to S301f. Details are not described herein again.

The foregoing describes a method in which the server establishes the M RSRP sets for the M neighboring base stations of the first base station, determines the second RSRP value from the RSRP set, and further determines the antenna azimuth of the first base station.

In a possible implementation, the server may further perform fitting on an RSRP set of each neighboring base station, to determine a fitting function corresponding to each neighboring base station. An independent variable of the fitting function may be an antenna azimuth, and a dependent variable may be an RSRP value. The server may determine the antenna azimuth of the first base station based on the fitting function and a measured RSRP value.

In this case, the following two scenarios are included: Scenario 1 and Scenario 2. Scenario 1: The RSRP set of the neighboring base station is an RSRP value that is of a reference signal from the neighboring base station, that is measured by the first base station, and that is simulated by the server, and the measured RSRP value is an RSRP value that is actually measured by the first base station and that is of the reference signal from the neighboring base station. Scenario 2: The RSRP set of the neighboring base station is an RSRP value that is of a reference signal from the first base station, that is measured by the neighboring base station, and that is simulated by the server, and the measured RSRP value is an RSRP value that is actually measured by the neighboring base station and that is of the reference signal from the first base station. The following separately describes Scenario 1 and Scenario 2 in detail.

Scenario 1: The RSRP set of the neighboring base station is an RSRP value that is of a reference signal from the neighboring base station, that is measured by the first base station, and that is simulated by the server, and the measured RSRP value is an RSRP value that is actually measured by the first base station and that is of the reference signal from the neighboring base station.

Figure 10:
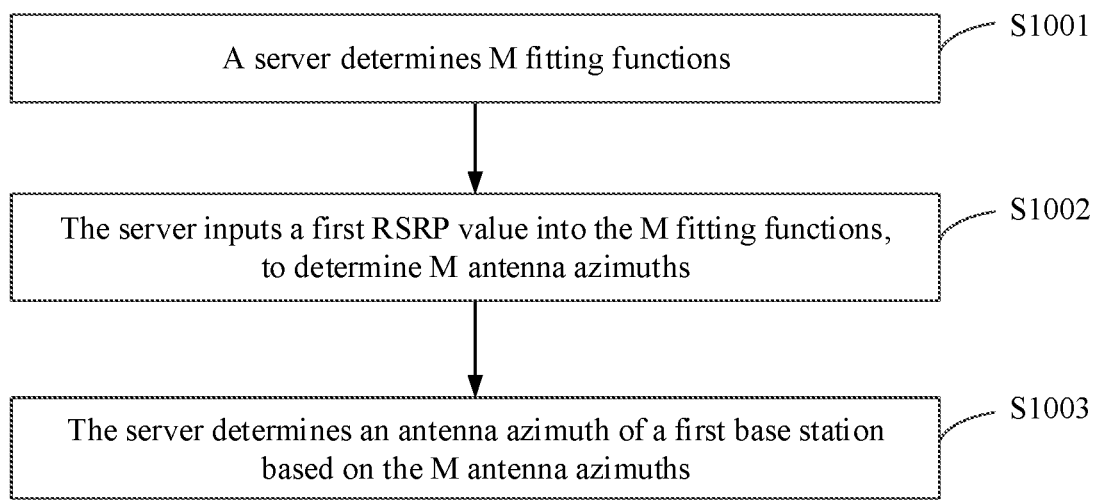
FIG. 10 is a schematic flowchart of another antenna positioning method for a first base station according to an embodiment of this application.

As shown in FIG. 10, in this scenario, the server may determine an antenna azimuth of the first base station by using the following S1001 to S1003.

S1001: The server determines M fitting functions.

An independent variable of the fitting function is an antenna azimuth, and a dependent variable is an RSRP value.

A first fitting function in the M fitting functions is determined through fitting based on N antenna azimuths and N RSRP values. The M fitting functions correspond to M neighboring base stations.

The N antenna azimuths are in one-to-one correspondence with the N RSRP values. The N antenna azimuths are N antenna azimuths of the first base station, and the N RSRP values are N RSRP values that are measured by the first base station and that are of reference signals from a first neighboring base station. M and N are both positive integers.

S1002: The server inputs a first RSRP value into the M fitting functions, to determine M antenna azimuths.

An RSRP value that is actually measured by the first base station and that is of the reference signal from the first neighboring base station may be interfered by another neighboring base station. Therefore, in S1001, when a fitting function of the neighboring base station is determined, interference of the another base station to the base station also needs to be considered for N RSRP values in the fitting function.

According to the foregoing method, the server separately inputs the RSRP value into each of the M fitting functions, to determine the M antenna azimuths.

S1003: The server determines the antenna azimuth of the first base station based on the M antenna azimuths.

The server determines a possible antenna azimuth of the first base station based on each of the M neighboring base stations of the first base station. Based on this, the server determines M possible antenna azimuths of the first base station in total. The server determines the antenna azimuth of the first base station based on the M possible antenna azimuths. The server expects that the finally determined antenna azimuth of the first base station is as close as possible to an actual antenna azimuth of the first base station.

Based on the foregoing technical solution, according to an antenna positioning method for the first base station provided in this embodiment of this application, the server determines a fitting function based on RSRP values that are theoretically measured by the first base station and that are of a neighboring base station when antenna azimuths of the first base station are different azimuths. The fitting function can represent a mathematical relationship between the antenna azimuth of the first base station and the measured RSRP value of the neighboring base station. The server inputs an RSRP value that is actually measured by the base station and that is of the neighboring base station into the fitting function, and determines the antenna azimuth of the first base station.

In this way, in this embodiment of this application, personnel do not need to check an antenna azimuth of a base station on site. The server may determine the antenna azimuth of the first base station based on the RSRP value that is measured by the first base station and that is of the neighboring base station. In this way, detection efficiency of detecting the antenna azimuth is improved and detection costs are reduced.

Figure 11:
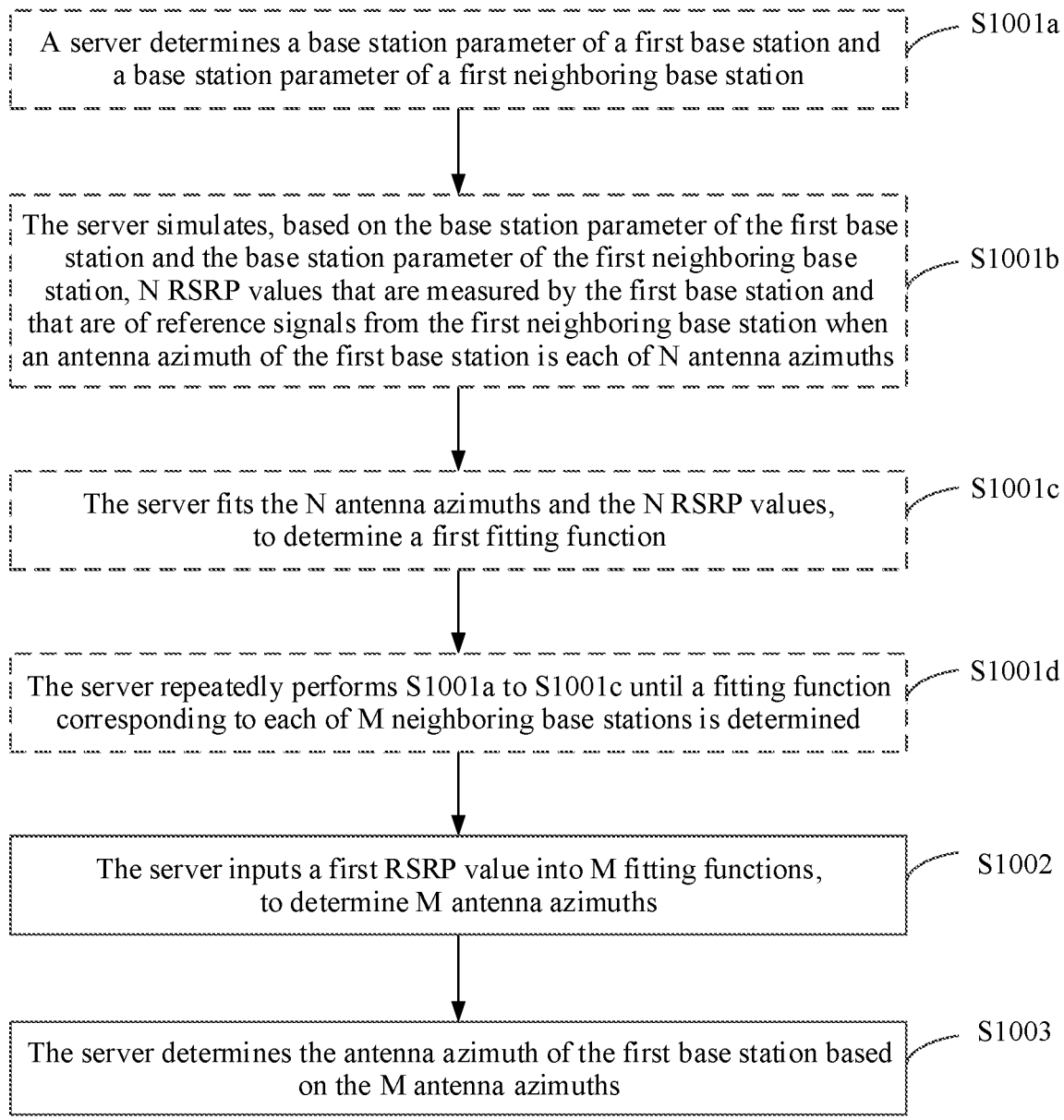
FIG. 11 is a schematic flowchart of another antenna positioning method for a first base station according to an embodiment of this application.

In a possible implementation, with reference to FIG. 10, as shown in FIG. 11, S1001 may be implemented by using the following steps.

S1001a: The server determines a base station parameter of the first base station and a base station parameter of the first neighboring base station.

A specific implementation of S1001a is similar to that of S301a. For the specific implementation of S1001a, refer to S301a. Details are not described herein again.

S1001b: The server simulates, based on the base station parameter of the first base station and the base station parameter of the first neighboring base station, the N RSRP values that are measured by the first base station and that are of the reference signals from the first neighboring base station when antenna azimuths of the first base station are the N antenna azimuths.

A specific implementation of S1001b is similar to that of S301b. For the specific implementation of S1001b, refer to S301b. Details are not described herein again.

S1001c: The server fits the N antenna azimuths and the N RSRP values, to determine a first fitting function.

Specifically, the server determines that an initial function is $f(x)=ax+b$. $f(x)$ is an RSRP value, and $x$ is an antenna azimuth.

The server determines N points based on the N antenna azimuths and the N RSRP values, where $x$ values of the N points are antenna azimuths, and $f(x)$ values of the N points are RSRP values.

The server determines a value $a$ and a value $b$ in the initial function through fitting by using a method of least squares, so that a sum of distances between a fitted function and the N points is the smallest.

The server inputs the value $a$ and the value $b$ in this case into the initial function, to obtain the first fitting function.

It should be noted that the initial function being $f(x)=ax+b$ is used only as an example for description. In an actual use process, the initial function may be any function.

S1001d: The server repeatedly performs S1001a to S1001c until a fitting function corresponding to each of M neighboring base stations is determined.

Scenario 2: The RSRP set of the neighboring base station is an RSRP value that is of the first base station, that is measured by the neighboring base station, and that is simulated by the server, and the measured RSRP value is an RSRP value that is actually measured by the neighboring base station and that is of the first base station.

Figure 12:
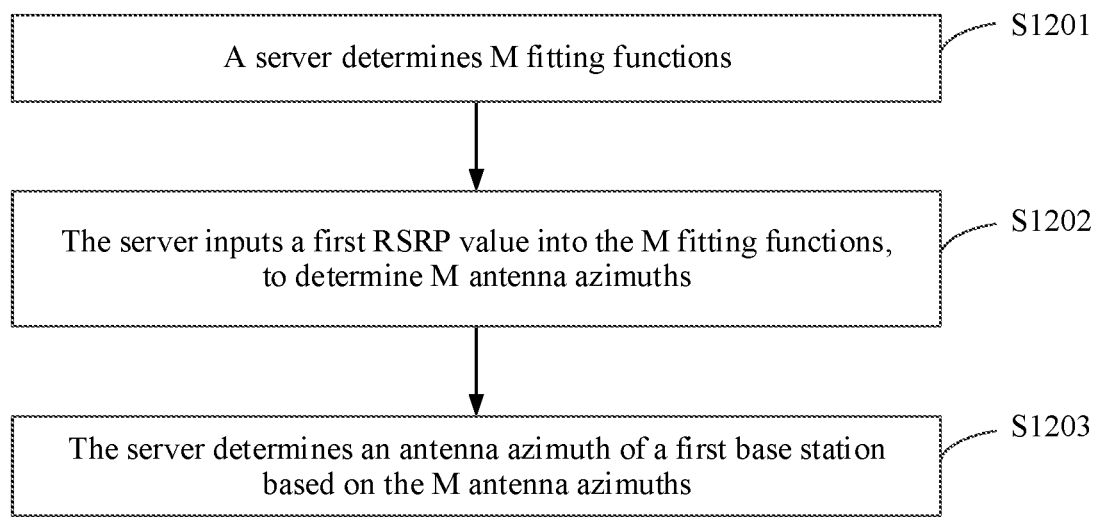
FIG. 12 is a schematic flowchart of another antenna positioning method for a first base station according to an embodiment of this application.

As shown in FIG. 12, in this scenario, the server may determine an antenna azimuth of the first base station by using the following S1201 to S1203.

S1201: The server determines M fitting functions.

An independent variable of the fitting function is an antenna azimuth, and a dependent variable is an RSRP value.

A first fitting function in the M fitting functions is determined through fitting based on N antenna azimuths and N RSRP values.

The N antenna azimuths are in one-to-one correspondence with the N RSRP values. The N antenna azimuths are N antenna azimuths of the first base station, and the N RSRP values are N RSRP values that are of the first base station and that are measured by a first neighboring base station of the first base station. M and N are both positive integers.

An implementation of S1201 is similar to an implementation of S1001. Details are not described herein again.

S1202: The server inputs a first RSRP value into the M fitting functions, to determine M antenna azimuths.

An implementation of S1202 is similar to an implementation of S1002. Details are not described herein again.

S1203: The server determines the antenna azimuth of the first base station based on the M antenna azimuths.

An implementation of S1203 is similar to an implementation of S1003. Details are not described herein again.

Based on the foregoing technical solution, according to an antenna positioning method for the first base station provided in this embodiment of this application, the server determines a fitting function based on RSRP values that are theoretically measured by a neighboring base station and that are of the first base station when antenna azimuths of the first base station are different azimuths. The fitting function can represent a mathematical relationship between the antenna azimuth of the first base station and the RSRP value that is measured by the neighboring base station and that is of the first base station. The server inputs an RSRP value that is actually measured by the base station and that is of the neighboring base station into the fitting function, and determines the antenna azimuth of the first base station.

In this way, in this embodiment of this application, personnel do not need to check an antenna azimuth of a base station on site. The server may determine the antenna azimuth of the first base station based on the RSRP value that is measured by the first base station and that is of the neighboring base station. In this way, detection efficiency of detecting the antenna azimuth is improved and detection costs are reduced.

Figure 13:
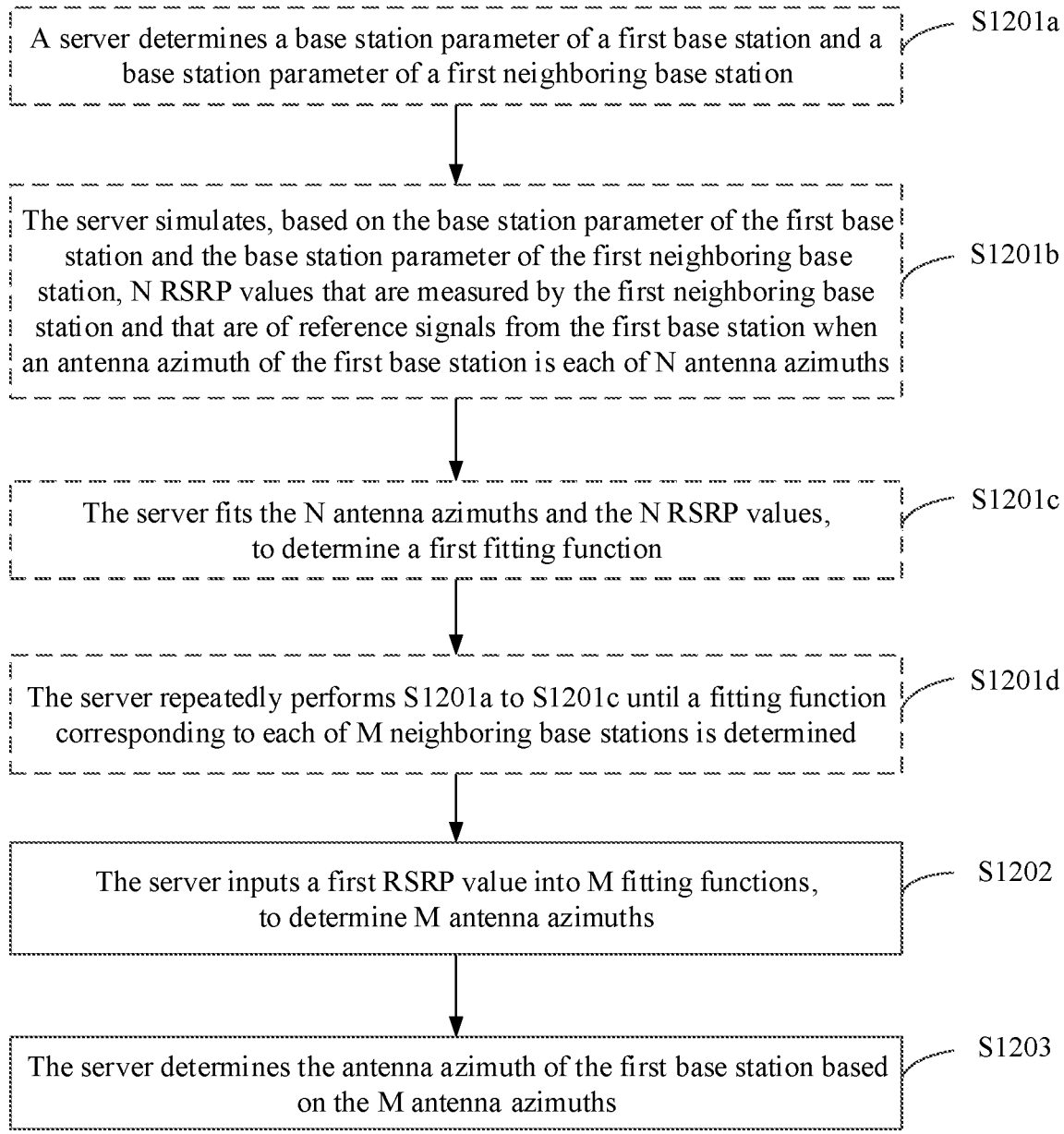
FIG. 13 is a schematic flowchart of another antenna positioning method for a first base station according to an embodiment of this application.

In a possible implementation, with reference to FIG. 12, as shown in FIG. 13, S1201 may be implemented by using the following steps.

S1201a: The server determines a base station parameter of the first base station and a base station parameter of the first neighboring base station.

A specific implementation of S1201a is similar to that of S301a. For the specific implementation of S1201a, refer to S301a. Details are not described herein again.

S1201b: The server simulates, based on the base station parameter of the first base station and the base station parameter of the first neighboring base station, the N RSRP values that are measured by the first neighboring base station and that are of reference signals from the first base station when antenna azimuths of the first base station are the N antenna azimuths.

A specific implementation of S1201b is similar to that of S701b. For the specific implementation of S1201b, refer to S701b. Details are not described herein again.

S1201c: The server fits the N antenna azimuths and the N RSRP values, to determine a first fitting function.

A specific implementation of S1201c is similar to that of S1001c. For the specific implementation of S1201c, refer to S1001c. Details are not described herein again.

S1201d: The server repeatedly performs S1201a to S1201c until a fitting function corresponding to each of M neighboring base stations is determined.

Based on the foregoing Scenario 1 and Scenario 2, the server may determine, through simulation based on base station parameters of the first base station and a neighboring base station, RSRPs that are measured by the first base station at different antenna azimuths and that are of the neighboring base station, and determine, based on the different antenna azimuths and corresponding RSRPs, a fitting function corresponding to the neighboring base station.

In this way, the server determines a fitting function by using a simulation method, so that personnel are prevented from measuring, on site, the RSRPs that are measured by the first base station at different antenna azimuths and that are of the neighboring base station.

The solutions in the foregoing embodiments of this application may be combined on a premise that the solutions are not contradictory.

The foregoing mainly describes the solutions in embodiments of this application from a perspective of interaction between network elements. It may be understood that to implement the foregoing functions, each network element, such as the base station or the server, includes at least one of a corresponding hardware structure and a corresponding software module for executing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

It should be noted that, the base station described below may be the first base station or a neighboring base station (for example, the first neighboring base station or the second neighboring base station) of the first base station recorded in the foregoing embodiments.

In embodiments of this application, the base station and the server may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, division into the units is an example, and is merely a logical function division. In actual implementation, another division manner may be used.

Figure 14:
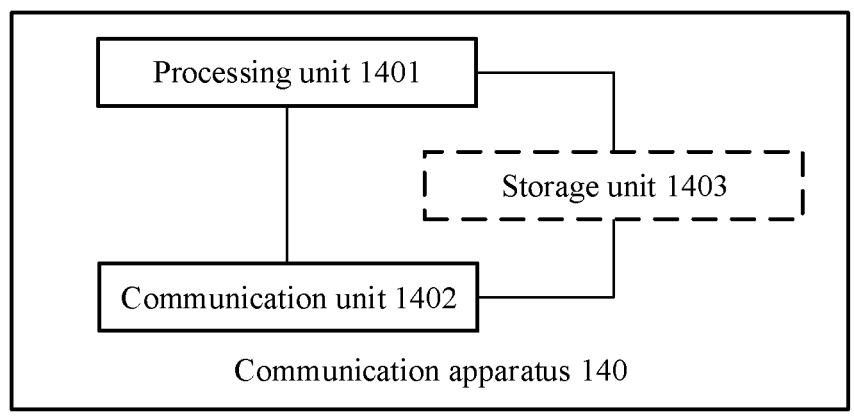
FIG. 14 is a schematic diagram of a structure of a communication apparatus according to an embodiment of this application.

When an integrated unit is used, FIG. 14 is a possible schematic diagram of a structure of a communication apparatus (denoted as a communication apparatus 140) in the foregoing embodiments. The communication apparatus 140 includes a processing unit 1401 and a communication unit 1402, and may further include a storage unit 1403. The schematic diagram of the structure shown in FIG. 14 may be used to show structures of the base station and the server in the foregoing embodiments.

When the schematic diagram of the structure shown in FIG. 14 is used to show the structure of the server in the foregoing embodiments, the processing unit 1401 is configured to control and manage an action of the server. For example, the processing unit 1401 controls the server to perform S202 and S203 in FIG. 2, S301 and S302 in FIG. 3, S301a to S301f and S302 in FIG. 4, Step 1 and Step 3 in FIG. 5, S602 and S603 in FIG. 6, S701 and S702 in FIG. 7, S701a to S701f and S702 in FIG. 8, Step 4 and Step 6 in FIG. 9, S1001 to S1003 in FIG. 10, S1001a to S1001d, S1002 and S1003 in FIG. 11, S1201 to S1203 in FIG. 12, S1201a to S1201d, S1202, and S1203 in FIG. 13, and/or an action performed by the server in another process described in embodiments of this application. The processing unit 1401 may communicate with another network entity through the communication unit 1402, for example, communicate with the base station shown in FIG. 1. The storage module 1403 is configured to store program code and data of the server.

When the schematic diagram of the structure shown in FIG. 14 is used to show the structure of the server in the foregoing embodiments, the communication apparatus 140 may be a server, or may be a chip in the server.

When the schematic diagram of the structure shown in FIG. 14 is used to show the structure of the base station in the foregoing embodiments, the processing unit 1401 is configured to control and manage an action of the base station. For example, the processing unit 1401 controls the base station to perform S201 and S202 in FIG. 2, Step 1, Step 2, and Step 3 in FIG. 5, S601 and S602 in FIG. 6, Step 4, Step 5, and Step 6 in FIG. 9 and/or an action performed by the base station in another process described in embodiments of this application. The processing unit 1401 may communicate with another network entity through the communication unit 1402, for example, communicate with the server shown in FIG. 1. The storage module 1403 is configured to store program code and data of the base station.

When the schematic diagram of the structure shown in FIG. 14 is used to show the structure of the base station in the foregoing embodiments, the communication apparatus 140 may be a base station, or may be a chip in the base station.

When the communication apparatus 140 is the server or the base station, the processing unit 1401 may be a processor or a controller, and the communication unit 1402 may be a communication interface, a transceiver, a transceiver machine, a transceiver circuit, a transceiver apparatus, or the like. The communication interface is a general term, and may include one or more interfaces. The storage unit 1403 may be a memory. When the communication apparatus 140 is the chip in the server or the chip in the base station, the processing unit 1401 may be a processor or a controller, and the communication unit 1402 may be an input interface and/or an output interface, a pin, a circuit, or the like. The storage unit 1403 may be a storage unit (for example, a register or a cache) in the chip, or may be a storage unit (for example, a read-only memory (read-only memory, ROM for short), a random access memory (RAM)) that is outside the chip in the server or the base station.

The communication unit may also be referred to as a transceiver unit. An antenna and a control circuit that have receiving and sending functions in the communication apparatus 140 may be considered as the communication unit 1402 of the communication apparatus 140, and a processor that has a processing function may be considered as the processing unit 1401 of the communication apparatus 140. Optionally, a component that is in the communication unit 1402 and that is configured to implement a receiving function may be considered as a receiving unit. The receiving unit is configured to perform a receiving step in embodiments of this application. The receiving unit may be a receiver machine, a receiver, a receiver circuit, or the like. A component that is in the communication unit 1402 and that is configured to implement a sending function may be considered as a sending unit. The sending unit is configured to perform a sending step in embodiments of this application. The sending unit may be a transmitter machine, a transmitter, a transmitter circuit, or the like.

When the integrated unit in FIG. 14 is implemented in a form of a software functional module and sold or used as an independent product, the integrated unit may be stored in a computer-readable storage medium. Based on such an understanding, the technical solutions in embodiments of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor to perform all or a part of the steps of the methods described in embodiments of this application. The storage medium for storing the computer software product includes: any medium that can store program code, such as a USB flash drive, a removable hard disk, a read-only memory, a random access memory, a magnetic disk, or an optical disc.

The unit in FIG. 14 may also be referred to as a module. For example, the processing unit may be referred to as a processing module.

Figure 15:
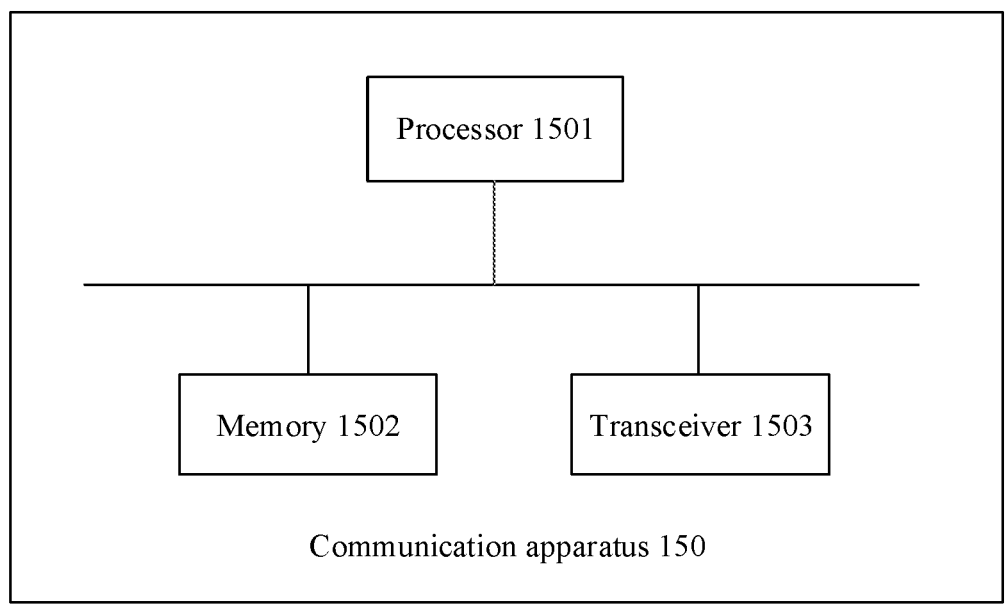
FIG. 15 is a schematic diagram of a hardware structure of a communication apparatus according to an embodiment of this application.
Figure 16:
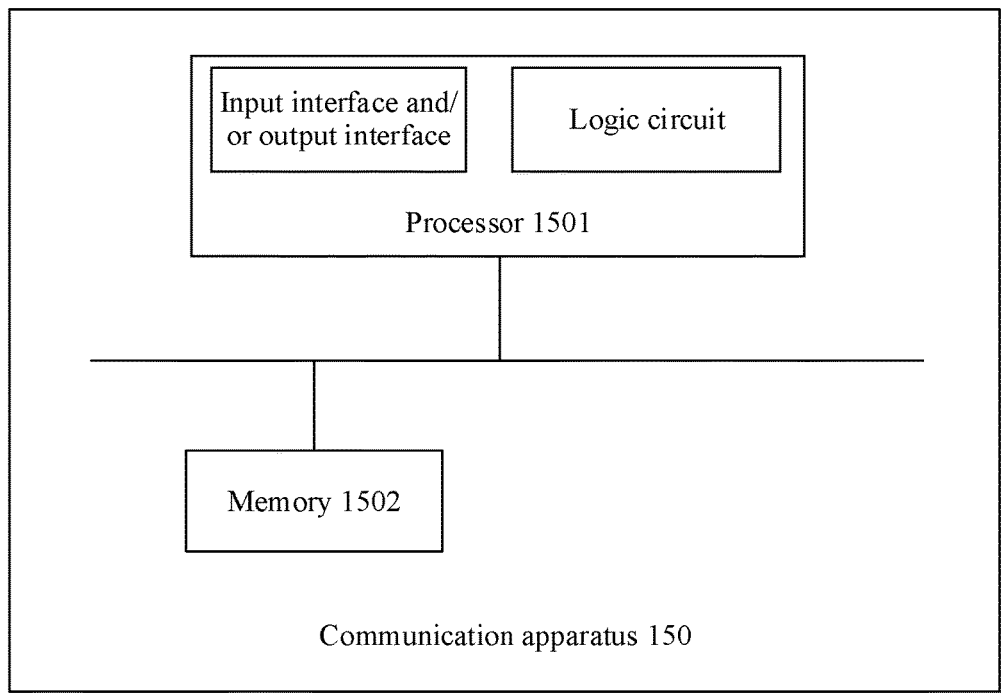
FIG. 16 is a schematic diagram of a hardware structure of another communication apparatus according to an embodiment of this application.

An embodiment of this application further provides a schematic diagram of a hardware structure of a communication apparatus (denoted as a communication apparatus 150). With reference to FIG. 15 or FIG. 16, the communication apparatus 150 includes a processor 1501. Optionally, the communication apparatus 150 further includes a memory 1502 that is connected to the processor 1501.

In a first possible implementation, as shown in FIG. 15, the communication apparatus 150 further includes a transceiver 1503. The processor 1501, the memory 1502, and the transceiver 1503 are connected through a bus. The transceiver 1503 is configured to communicate with another device or a communication network. Optionally, the transceiver 1503 may include a transmitter machine and a receiver machine. A component configured to implement a receiving function in the transceiver 1503 may be considered as a receiver machine. The receiver machine is configured to perform a receiving step in embodiments of this application. A component configured to implement a sending function in the transceiver 1503 may be considered as a transmitter machine. The transmitter machine is configured to perform a sending step in embodiments of this application.

Based on the first possible implementation, the schematic diagram of the structure shown in FIG. 15 may be used to show a structure of the base station or the server in the foregoing embodiments.

When the schematic diagram of the structure shown in FIG. 15 is used to show the structure of the server in the foregoing embodiments, the processor 1501 is configured to control and manage an action of the server. For example, the processor 1501 is configured to support the server in performing S202 and S203 in FIGS. 2, S301 and S302 in FIG. 3, S301a to S301f and S302 in FIG. 4, Step 1 and Step 3 in FIG. 5, S602 and S603 in FIG. 6, S701 and S702 in FIG. 7, S701a to S701f and S702 in FIG. 8, Step 4 and Step 6 in FIG.

9, S1001 to S1003 in FIG. 10, S1001a to S1001d, S1002 and S1003 in FIG. 11, S1201 to S1203 in FIG. 12, S1201a to S1201d, S1202, and S1203 in FIG. 13, and/or an action performed by the server in another process described in embodiments of this application. The processor 1501 may communicate with another network entity through the transceiver 1503, for example, communicate with the base station shown in FIG. 1. The memory 1502 is configured to store program code and data of the server.

When the schematic diagram of the structure shown in FIG. 15 is used to show the structure of the base station in the foregoing embodiments, the processor 1501 is configured to control and manage an action of the base station. For example, the processor 1501 is configured to support the base station in performing S201 and S202 in FIG. 2, Step 1, Step 2, and Step 3 in FIG. 5, S601 and S602 in FIG. 6, Step 4, Step 5, and Step 6 in FIG. 9 and/or an action performed by the base station in another process described in embodiments of this application. The processor 1501 may communicate with another network entity through the transceiver 1503, for example, communicate with the server shown in FIG. 1. The memory 1502 is configured to store program code and data of the base station.

In a second possible implementation, the processor 1501 includes a logic circuit and at least one of an input interface and an output interface. The output interface is configured to perform a sending action in a corresponding method, and the input interface is configured to perform a receiving action in the corresponding method.

Based on the second possible implementation, with reference to FIG. 16, the schematic diagram of the structure shown in FIG. 16 may be used to show a structure of the base station or the server in the foregoing embodiments.

When the schematic diagram of the structure shown in FIG. 16 is used to show the structure of the server in the foregoing embodiments, the processor 1501 is configured to control and manage an action of the server. For example, the processor 1501 is configured to support the server in performing S202 and S203 in FIG. 2, S301 and S302 in FIG. 3, S301a to S301f and S302 in FIG. 4, Step 1 and Step 3 in FIG. 5, S602 and S603 in FIG. 6, S701 and S702 in FIG. 7, S701a to S701f and S702 in FIG. 8, Step 4 and Step 6 in FIG. 9, S1001 to S1003 in FIG. 10, S1001a to S1001d, S1002 and S1003 in FIG. 11, S1201 to S1203 in FIG. 12, S1201a to S1201d, S1202, and S1203 in FIG. 13, and/or an action performed by the server in another process described in embodiments of this application. The processor 1501 may communicate with another network entity through at least one of the input interface and the output interface, for example, communicate with the base station shown in FIG. 1. The memory 1502 is configured to store program code and data of the server.

When the schematic diagram of the structure shown in FIG. 16 is used to show the structure of the base station in the foregoing embodiments, the processor 1501 is configured to control and manage an action of the base station. For example, the processor 1501 is configured to support the base station in performing S201 and S202 in FIG. 2, Step 1, Step 2, and Step 3 in FIG. 5, S601 and S602 in FIG. 6, Step 4, Step 5, and Step 6 in FIG. 9 and/or an action performed by the base station in another process described in embodiments of this application. The processor 1501 may communicate with another network entity through at least one of the input interface and the output interface, for example, communicate with the server shown in FIG. 1. The memory 1502 is configured to store program code and data of the base station.

FIG. 15 and FIG. 16 may alternatively show a system chip in the base station. In this case, an action performed by the base station may be implemented by the system chip. For a specific action performed, refer to the foregoing descriptions. Details are not described herein again. FIG. 15 and FIG. 16 may alternatively show a system chip in the server. In this case, an action performed by the server may be implemented by the system chip. For a specific action performed, refer to the foregoing descriptions. Details are not described herein again.

In addition, embodiments of this application further provide a schematic diagram of a hardware structure of a server (denoted as a server 170) and a schematic diagram of a hardware structure of a base station (denoted as a base station 180). For details, refer to FIG. 17 and FIG. 18 respectively.

Figure 17:
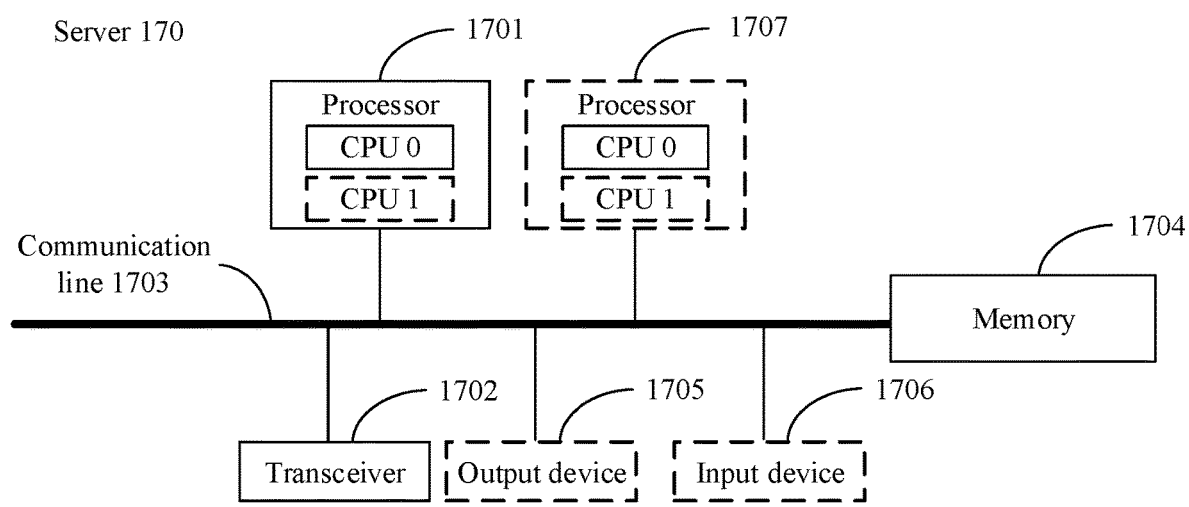
FIG. 17 is a schematic diagram of a hardware structure of a server according to an embodiment of this application.

FIG. 17 is a schematic diagram of a hardware structure of the server 170. As shown in FIG. 17, the server 170 includes a processor 1701, a transceiver 1702, and a communication line 1703.

Further, the server 170 may further include a memory 1704. The processor 1701, the memory 1704, and the transceiver 1702 may be connected through the communication line 1703.

The processor 1701 is a central processing unit (CPU), a general-purpose processor, a network processor (NP), a digital signal processor (DSP), a microprocessor, a microcontroller, a programmable logic device (PLD), or any combination thereof. Alternatively, the processor 1701 may be another apparatus having a processing function, for example, a circuit, a component, or a software module. This is not limited.

The processor 1701 is mainly configured to: process a communication protocol and communication data, control the entire server, execute a software program, and process data of the software program. For example, the processor 1701 is configured to control the server to perform S202 and S203 in FIG. 2, S301 and S302 in FIG. 3, S301a to S301f and S302 in FIG. 4, Step 1 and Step 3 in FIG. 5, S602 and S603 in FIG. 6, S701 and S702 in FIG. 7, S701a to S701f and S702 in FIG. 8, Step 4 and Step 6 in FIG. 9, S1001 to S1003 in FIG. 10, S1001a to S1001d, S1002 and S1003 in FIG. 11, S1201 to S1203 in FIG. 12, S1201a to S1201d, S1202, and S1203 in FIG. 13, and/or an action performed by the server in another process described in embodiments of this application.

The transceiver 1702 is configured to communicate with another device or another communication network. The another communication network may be an Ethernet, a radio access network (RAN), a wireless local area network (WLAN), or the like. The transceiver 1702 may be a module, a circuit, a transceiver, or any apparatus that can implement communication.

The communication line 1703 is configured to transmit information between components included in the server 170.

The memory 1704 is configured to store instructions. The instructions may be a computer program.

The memory 1704 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or the like. This is not limited.

It should be noted that the memory 1704 may be independent of the processor 1701, or may be integrated with the processor 1701. The memory 1704 may be configured to store instructions, program code, some data, or the like. The memory 1704 may be located inside the server 170, or may be located outside the server 170. This is not limited. The processor 1701 is configured to execute the instructions stored in the memory 1704, to implement the antenna positioning method for the first base station provided in the following embodiments of this application.

In an example, the processor 1701 may include one or more CPUs, for example, a CPU 0 and a CPU 1 in FIG. 17.

In an optional implementation, the server 170 includes a plurality of processors. For example, in addition to the processor 1701 in FIG. 17, the server 170 may further include a processor 1707.

In an optional implementation, the server 170 further includes an output device 1705 and an input device 1706. For example, the input device 1706 is a device, for example, a keyboard, a mouse, a microphone, or a joystick, and the output device 1705 is a device, for example, a display screen, or a speaker.

It should be noted that the server 170 may be a network server, an embedded device, a chip system, or a device having a structure similar to that in FIG. 17. In addition, the composition structure shown in FIG. 17 does not constitute a limitation on the server. In addition to the components shown in FIG. 17, the server may include more or fewer components than those shown in the figure, or combine some components, or have different component arrangements.

In this embodiment of this application, the chip system may include a chip, or may include a chip and another discrete component.

In an optional implementation, the processor may include a baseband processor and a central processing unit. The baseband processor is mainly configured to process the communication protocol and the communication data. The central processing unit is mainly configured to: control the entire server, execute the software program, and process the data of the software program. The processor in FIG. 17 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the server may include a plurality of baseband processors to adapt to different network standards, and the server may include a plurality of central processing units to enhance a processing capability of the server. All the components of the server may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

Figure 18:
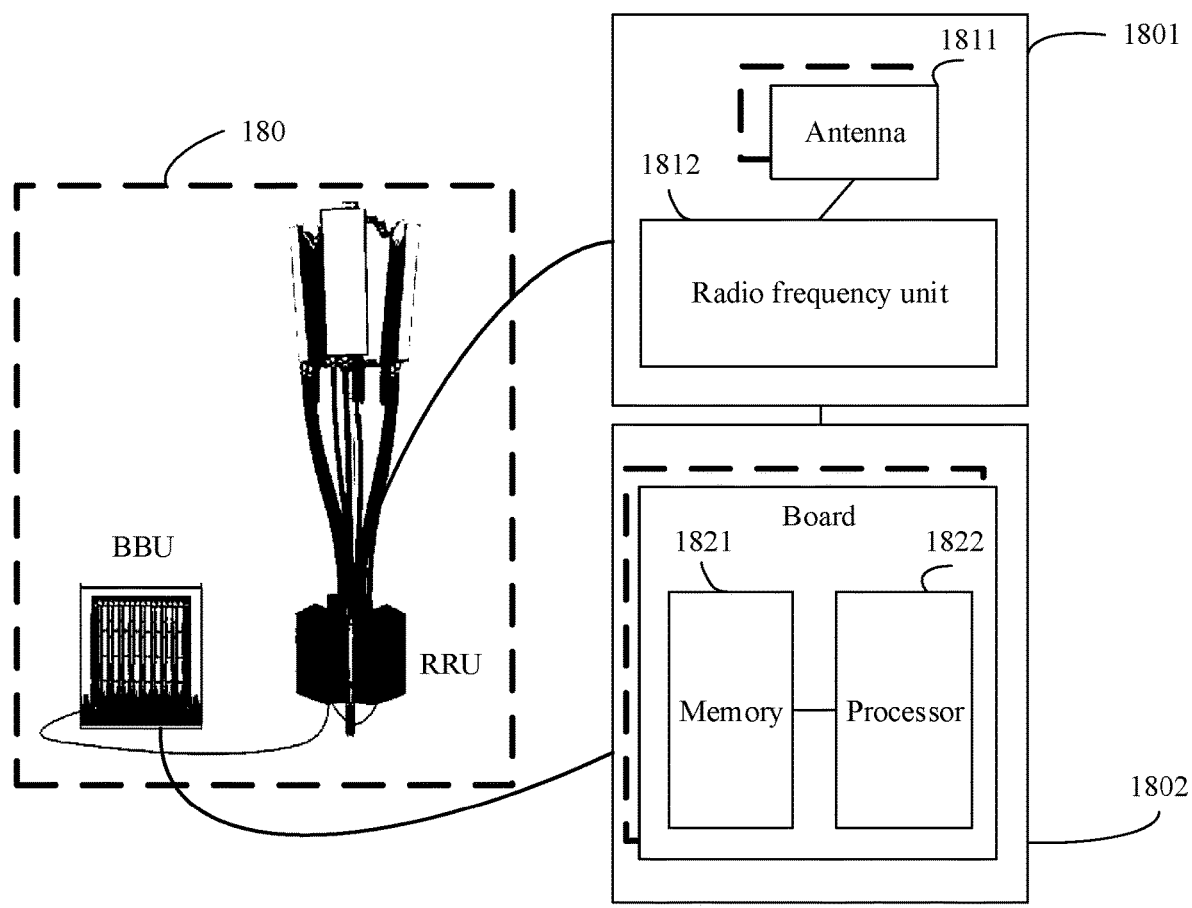
FIG. 18 is a schematic diagram of a hardware structure of a base station according to an embodiment of this application.

FIG. 18 is a schematic diagram of a hardware structure of a base station 180. The base station 180 may include one or more radio frequency units, such as a remote radio unit (RRU) 1801 and one or more baseband units (BBUs) (which may also be referred to as digital units (DUs)) 1802.

The RRU 1801 may be referred to as a transceiver unit, a transceiver machine, a transceiver circuit, a transceiver, or the like, and may include at least one antenna 1811 and a radio frequency unit 1812. The RRU 1801 part is mainly configured to receive and send a radio frequency signal and perform conversion between the radio frequency signal and a baseband signal. The RRU 1801 and the BBU 1802 may be physically disposed together, or may be physically disposed separately, for example, a distributed base station.

The BBU 1802 is a control center of the base station, may also be referred to as a processing unit, and is mainly configured to implement baseband processing functions, such as channel coding, multiplexing, modulation, and spread spectrum.

In an embodiment, the BBU 1802 may include one or more boards. A plurality of boards may jointly support a radio access network (for example, an LTE network) of a single access standard, or may respectively support radio access networks (for example, an LTE network, a 5G network, or another network) of different access standards. The BBU 1802 further includes a memory 1821 and a processor 1822. The memory 1821 is configured to store necessary instructions and data. The processor 1822 is configured to control the base station to perform a necessary action. The memory 1821 and the processor 1822 may serve one or more boards. In other words, a memory and a processor may be disposed on each board. Alternatively, a plurality of boards may share a same memory and a same processor. In addition, a necessary circuit may further be disposed on each board.

It should be understood that the base station 180 shown in FIG. 18 can perform S201 and S202 in FIG. 2, Step 1, Step 2, and Step 3 in FIG. 5, S601 and S602 in FIG. 6, Step 4, Step 5, and Step 6 in FIG. 9 and/or an action performed by the base station in another process described in embodiments of this application. Operations, functions, or operations and functions of modules in the base station 180 are separately set to implement corresponding procedures in the foregoing method embodiments. For details, refer to the descriptions in the foregoing method embodiments. To avoid repetition, detailed descriptions are properly omitted herein.

In an implementation process, the steps in the method provided in this embodiment may be completed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

The processor in this application may include but is not limited to at least one of the following types: a central processing unit (CPU), a microprocessor, a digital signal processor (DSP), a microcontroller unit (MCU), or a computing device used for running software like an artificial intelligence processor. Each computing device may include one or more cores used to execute software instructions to perform operations or processing. The processor may be an independent semiconductor chip, or may be integrated with another circuit into a semiconductor chip. For example, the processor may form a SoC (a system-on-a-chip) with another circuit (for example, a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core used to execute software instructions to perform operations or processing, the processor may further include a necessary hardware accelerator, for example, a field programmable gate array (FPGA), a PLD (a programmable logic device), or a logic circuit that implements a dedicated logic operation.

The memory in embodiments of this application may include at least one of the following types: a read-only memory (ROM) or another type of static storage device that can store static information and instructions, a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing base station and server.

An embodiment of this application further provides a chip. The chip includes a processor and an interface circuit. The interface circuit is coupled to the processor. The processor is configured to run computer programs or instructions, to implement the foregoing methods. The interface circuit is used to communicate with another module outside the chip.

All or a part of the foregoing embodiments may be implemented by software, hardware, firmware, or any combination thereof. When a software program is used to implement the foregoing embodiments, all or a part of the foregoing embodiments may be implemented in a form of a computer program product. The computer program product includes one or more computer instructions. When the computer program instructions are loaded and executed on a computer, all or part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that a person skilled in the art can make various modifications and variations of this application without departing from the spirit and scope of this application. This application is intended to cover these modifications and variations of this application provided that they fall within the scope of protection defined by the following claims and their equivalent technologies.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication apparatus, which is a server or included in the server, wherein the communication apparatus comprises:
    at least one processor; and
    one or more memories coupled to the at least one processor and storing programming instructions for execution by the at least one to perform operations comprising:
        receiving a first reference signal received power (RSRP) value from a first base station, wherein the first RSRP value is measured by the first base station and is of a reference signal from a first neighboring base station of the first base station; and
        determining an antenna azimuth of the first base station based on an RSRP set corresponding to the first neighboring base station and the first RSRP value, wherein the RSRP set corresponding to the first neighboring base station comprises N RSRP values, the N RSRP values correspond to N antenna azimuths of the first base station, and N is a positive integer.

2. The communication apparatus according to claim 1, wherein the determining an antenna azimuth of the first base station based on an RSRP set corresponding to the first neighboring base station and the first RSRP value comprises:

determining a second RSRP value, wherein the second RSRP value is in the RSRP set corresponding to the first neighboring base station and has a highest matching degree with the first RSRP value; and determining an antenna azimuth corresponding to the second RSRP value as the antenna azimuth of the first base station.

3. The communication apparatus according to claim 2, wherein the second RSRP value is in the RSRP set corresponding to the first neighboring base station and has a smallest difference from the first RSRP value.

4. The communication apparatus according to claim 1, wherein:
the one or more memories store the programming instructions for execution by the at least one processor to perform operations comprising:
receiving a third RSRP value from the first base station, wherein the third RSRP value is measured by the first base station and is of a reference signal from a second neighboring base station of the first base station; and
the determining an antenna azimuth of the first base station based on an RSRP set corresponding to the first neighboring base station and the first RSRP value comprises:
determining the antenna azimuth of the first base station based on the RSRP set corresponding to the first neighboring base station, an RSRP set corresponding to the second neighboring base station, the first RSRP value, and the third RSRP value, wherein the RSRP set corresponding to the second neighboring base station comprises K RSRP values, the K RSRP values correspond to K antenna azimuths of the first base station, and K is a positive integer.

5. The communication apparatus according to claim 4, wherein the determining the antenna azimuth of the first base station based on the RSRP set corresponding to the first neighboring base station, an RSRP set corresponding to the second neighboring base station, the first RSRP value, and the third RSRP value comprises:
determining a second RSRP value and a fourth RSRP value, wherein the second RSRP value is in the RSRP set corresponding to the first neighboring base station and has a highest matching degree with the first RSRP value, and the fourth RSRP value is in the RSRP set corresponding to the second neighboring base station and has a highest matching degree with the third RSRP value;
fitting an antenna azimuth corresponding to the second RSRP value and an antenna azimuth corresponding to the fourth RSRP value; and
determining the antenna azimuth of the first base station.

6. The communication apparatus according to claim 5, wherein:
the second RSRP value is in the RSRP set corresponding to the first neighboring base station and has a smallest difference from the first RSRP value; and
the fourth RSRP value is in the RSRP set corresponding to the second neighboring base station and has a smallest difference from the third RSRP value.

7. The communication apparatus according to claim 5, wherein the fitting an antenna azimuth corresponding to the second RSRP value and an antenna azimuth corresponding to the fourth RSRP value, and determining the antenna azimuth of the first base station comprises:
determining, according to a method of least squares, a first antenna azimuth that has a smallest sum of squared errors with the antenna azimuth corresponding to the second RSRP value and the antenna azimuth corresponding to the fourth RSRP value; and
determining the first antenna azimuth as the antenna azimuth of the first base station.

8. The communication apparatus according to claim 4, wherein the K RSRP values in the RSRP set corresponding to the second neighboring base station comprise:
RSRP values that are of reference signals received by the first base station from the second neighboring base station and that are determined by the server through simulation when antenna azimuths of the first base station are the K antenna azimuths.

9. The communication apparatus according to claim 1, wherein the N RSRP values in the RSRP set corresponding to the first neighboring base station comprise:
RSRP values that are of reference signals received by the first base station from the first neighboring base station and that are determined by the server through simulation when antenna azimuths of the first base station are the N antenna azimuths.

10. The communication apparatus according to claim 1, wherein the one or more memories store the programming instructions for execution by the at least one processor to perform operations comprising:
before receiving the first RSRP value from the first base station, sending first indication information to the first base station, wherein the first indication information indicates to the first base station to send the first RSRP value to the server.

11. The communication apparatus according to claim 10, wherein the first indication information further indicates configuration information of the reference signal from the first neighboring base station.

12. A communication apparatus, which is a first base station or included in the first base station, wherein the communication apparatus comprises:
at least one processor; and
one or more memories coupled to the at least one processor and storing programming instructions for execution by the at least one processor to perform operations comprising:
receiving, by the first base station, first indication information from a server, wherein the first indication information comprises configuration information of a reference signal from a first neighboring base station of the first base station;
measuring, by the first base station, a first reference signal received power (RSRP) value of the first neighboring base station of the first base station; and
sending, by the first base station, the first RSRP value to the server.

13. The communication apparatus according to claim 12, wherein the one or more memories store the programming instructions for execution by the at least one processor to perform the following operations:
obtaining a second RSRP value of a reference signal from a second neighboring base station of the first base station; and
sending the second RSRP value to the server.

14. The communication apparatus according to claim 13, wherein the first indication information indicates to the first base station to send the first RSRP value to the server.

15. The communication apparatus according to claim 12, wherein measuring, by the first base station, the first RSRP value of the first neighboring base station of the first base station comprises:
  measuring, by the first base station, the first RSRP value of the first neighboring base station of the first base station based on the configuration information of the reference signal from the first neighboring base station of the first base station.

16. A communication system, wherein the communication system comprises a server and a first base station, and wherein:
  the first base station is configured to:
    measure a first reference signal received power (RSRP) value of a first neighboring base station of the first base station; and
    send the first RSRP value to the server;
  the server is configured to:
    receive the first RSRP value from the first base station; and
    determine an antenna azimuth of the first base station based on an RSRP set corresponding to the first neighboring base station and the first RSRP value, wherein the RSRP set corresponding to the first neighboring base station comprises N RSRP values, the N RSRP values correspond to N antenna azimuths of the first base station, and N is a positive integer.

17. The communication system according to claim 16, wherein the determining an antenna azimuth of the first base station based on an RSRP set corresponding to the first neighboring base station and the first RSRP value comprises:
  determining a second RSRP value, wherein the second RSRP value is in the RSRP set corresponding to the first neighboring base station and has a highest matching degree with the first RSRP value; and
  determining an antenna azimuth corresponding to the second RSRP value as the antenna azimuth of the first base station.

18. The communication system according to claim 17, wherein the second RSRP value is in the RSRP set corresponding to the first neighboring base station and has a smallest difference from the first RSRP value.

19. The communication system according to claim 16, wherein:
  the server is further configured to:
    receive a third RSRP value from the first base station, wherein the third RSRP value is measured by the first base station and is of a reference signal from a second neighboring base station of the first base station; and
  the determining an antenna azimuth of the first base station based on an RSRP set corresponding to the first neighboring base station and the first RSRP value comprises:
    determining the antenna azimuth of the first base station based on the RSRP set corresponding to the first neighboring base station, an RSRP set corresponding to the second neighboring base station, the first RSRP value, and the third RSRP value, wherein the RSRP set corresponding to the second neighboring base station comprises K RSRP values, the K RSRP values correspond to K antenna azimuths of the first base station, and K is a positive integer.

20. The communication system according to claim 19, wherein the determining the antenna azimuth of the first base station based on the RSRP set corresponding to the first neighboring base station, an RSRP set corresponding to the second neighboring base station, the first RSRP value, and the third RSRP value comprises:
  determining a second RSRP value and a fourth RSRP value, wherein the second RSRP value is in the RSRP set corresponding to the first neighboring base station and has a highest matching degree with the first RSRP value, and the fourth RSRP value is in the RSRP set corresponding to the second neighboring base station and has a highest matching degree with the third RSRP value;
  fitting an antenna azimuth corresponding to the second RSRP value and an antenna azimuth corresponding to the fourth RSRP value; and
  determining the antenna azimuth of the first base station.

* * * * *